United States Patent [19]
Shimura

[11] Patent Number: 5,539,838
[45] Date of Patent: Jul. 23, 1996

[54] ABNORMAL PATTERN DETECTING APPARATUS PATTERN FINDING APARATUS AND LINER PATTERN WIDTH CALCULATING APPARATUS

[75] Inventor: Kazuo Shimura, Kanagawa-ken, Japan

[73] Assignee: Fuji Photo Film Co., Ltd., Kanagawa, Japan

[21] Appl. No.: 421,010

[22] Filed: Apr. 13, 1995

Related U.S. Application Data

[63] Continuation of Ser. No. 760,440, Sep. 16, 1991, abandoned.

[30] Foreign Application Priority Data

Sep. 14, 1990 [JP] Japan ................................. 2-244195
Sep. 14, 1990 [JP] Japan ................................. 2-244196
Sep. 14, 1990 [JP] Japan ................................. 2-244197
Sep. 14, 1990 [JP] Japan ................................. 2-244198

[51] Int. Cl.⁶ ............................................... G06K 9/00
[52] U.S. Cl. ...................................................... 382/128
[58] Field of Search ................................. 382/128, 203, 382/190, 201, 195, 282; 364/413.13, 413.23; 375/901; 358/111, 96; 128/693.2, 693.3, 695; 250/327.2; 348/162, 77

[56] References Cited

U.S. PATENT DOCUMENTS

| | | | |
|---|---|---|---|
| 4,258,264 | 3/1981 | Kotera et al. | 250/484 |
| 4,276,473 | 6/1981 | Kato et al. | 250/327.1 |
| 4,315,318 | 2/1982 | Kato et al. | 364/515 |
| 4,387,428 | 6/1983 | Ishida et al. | 364/414 |
| 4,769,850 | 9/1988 | Itoh et al. | 382/25 |
| 4,843,629 | 6/1989 | Mischler et al. | 382/6 |
| 4,907,156 | 3/1990 | Doi et al. | 364/413.13 |
| 5,003,979 | 4/1991 | Merickel et al. | 128/653 A |
| 5,016,173 | 5/1991 | Kenet et al. | 364/413.13 |
| 5,033,100 | 7/1991 | Hara et al. | 382/25 |
| 5,123,054 | 6/1992 | Hara et al. | 382/6 |

FOREIGN PATENT DOCUMENTS

| | | | |
|---|---|---|---|
| 56-11395 | 2/1981 | Japan | G21K 4/00 |
| 61-5193 | 2/1986 | Japan | G06F 15/62 |

*Primary Examiner*—Jose L. Couso
*Attorney, Agent, or Firm*—Sughrue, Mion, Zinn, Macpeak & Seas

[57] ABSTRACT

From an image signal made up of a series of image signal components representing a radiation image, an abnormal pattern appearing as an approximately circular pattern in the radiation image is detected. A first finding device finds a prospective abnormal pattern appearing in the radiation image by processing the image signal with a first filter capable of finding an approximately circular pattern. A second finding device finds a linear pattern appearing in the radiation image by processing the image signal with a second filter capable of finding a linear pattern or a linear pattern the width and the length of which are approximately equal to each other. A judgment device selects an enlarged prospective abnormal pattern region in an image area, in which both the prospective abnormal pattern and the linear pattern have been found, the enlarged prospective abnormal pattern region including the prospective abnormal pattern and extending to parts around the prospective abnormal pattern. The area and the maximum width of the linear pattern falling within the enlarged prospective abnormal pattern region are then calculated. From the area and the maximum width of the linear pattern, a judgment is made as to whether the prospective abnormal pattern is or is not a true abnormal pattern.

11 Claims, 8 Drawing Sheets

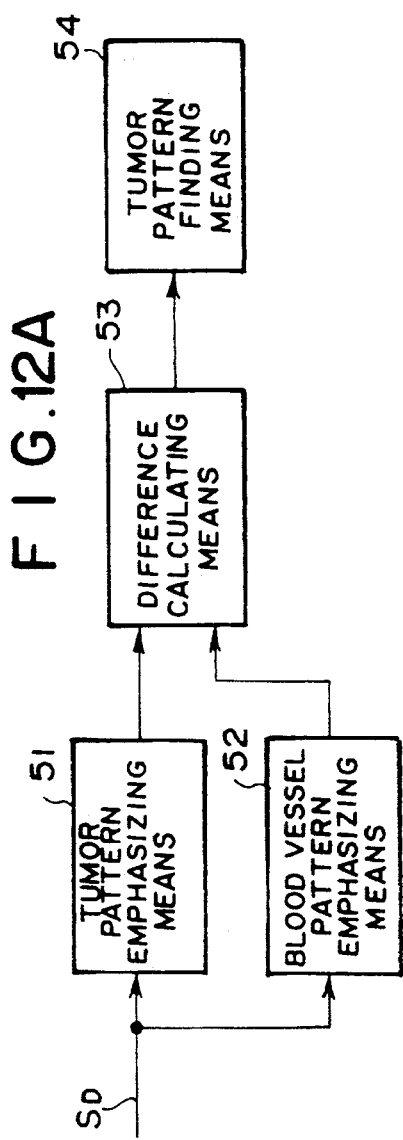

ABNORMAL PATTERN DETECTING APPARATUS PATTERN FINDING APARATUS AND LINER PATTERN WIDTH CALCULATING APPARATUS

This is a Continuation of Application Ser. No. 07/760,440 filed Sep. 16, 1991 now abandoned.

BACKGROUND OF THE INVENTION

1. Field of the Invention

This invention relates to a pattern finding apparatus. This invention particularly relates to a pattern finding apparatus wherein, from an image signal made up of a series of image signal components representing a radiation image of an object, a judgment is made as to whether a predetermined picture element P0 in the radiation image falls or does not fall within the region corresponding to a predetermined pattern, such as a blood vessel pattern, in the radiation image. This invention also relates to a linear pattern width calculating apparatus, wherein a calculation is made to find the width (or the thickness) of a linear pattern, such as a blood vessel pattern or a rib pattern, which may appear in a radiation image. This invention further relates to an abnormal pattern detecting apparatus, wherein an abnormal pattern appearing as an approximately circular pattern in a radiation image of an object is detected from an image signal made up of a series of image signal components representing the radiation image.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal (image signal), and the image signal is processed and then used for reproducing the X-ray image as a visible image on a copy photograph, or the like. In this manner, a visible image having good image quality with high contrast, high sharpness, high graininess, or the like, can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor. As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation, which has passed through an object, such as the human body. In this manner, a radiation image of the object is stored on the stimulable phosphor sheet. The stimulable phosphor sheet, on which the radiation image has been stored, is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material, such as photographic film, on a display device, such as a cathode ray tube (CRT), or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT.

Recently, in the radiation image recording and reproducing systems which use X-ray film or stimulable phosphor sheets, particularly in such radiation image recording and reproducing systems designed to facilitate medical diagnoses, not only have image signals been processed in ways which ensure that the visible images produced from them will be of high quality, but image signals have also been processed in ways which allow certain image patterns to be extracted from radiation images. One type of processing which results in extraction of an image pattern is disclosed in, for example, U.S. Pat. No. 4,769,850.

Specifically, an image pattern can be detected in a complicated radiation image by processing the image signal representing it in various ways. The image signal is made up of a series of image signal components, and with appropriate processing the image signal components corresponding to a particular image pattern can be found. For example, from a very complicated radiation image, such as an X-ray image of the chest of a human body, which includes various linear and circular patterns, an approximately circular pattern corresponding to a tumor, or the like, can be detected.

After a pattern, for example, a tumor pattern, is detected in a complicated radiation image, such as an X-ray image of the chest or a mammagram of a human body, a visible image is reproduced and displayed such that the detected pattern can be viewed clearly. Such a visible image can serve as an effective tool in, particularly, the efficient and accurate diagnosis of an illness.

When an image pattern is to be detected, operations are often carried out to find a linear pattern in a radiation image, for example, a pattern of a blood vessel in an X-ray image of a human body. The operations for finding a blood vessel pattern are carried out when a reproduced visible image, in which the blood vessel pattern is illustrated clearly, is to be obtained. Alternatively, the operations for finding a blood vessel pattern are carried out when the blood vessel pattern need not be illustrated clearly in a reproduced visible image but, for example, a tumor pattern (an approximately circular pattern) is to be detected from an X-ray image of a human body. Specifically, an X-ray image of a human body has a very complicated configuration. For example, an X-ray image of a human body includes a pattern of a branch point of a blood vessel, at which the blood vessel divides into two branches, and a pattern of a blood vessel, which extends in the direction normal to the plane of the X-ray image, i.e. in the direction along which the X-rays were irradiated during the recording of the X-ray image. Such blood vessel patterns are approximately circular. Therefore, when a tumor pattern is to be detected, such approximately circular blood vessel patterns are often detected as tumor patterns. Accordingly, accurate operations for finding a tumor pattern should be carried out by discriminating whether a pattern, which has been detected as a tumor pattern, is a true tumor pattern or an approximately circular blood vessel pattern. For this purpose, it is necessary for a blood vessel pattern to be found.

As described above, it often becomes necessary that a linear pattern in a radiation image be found. In such cases, a method should be selected with which a linear pattern can be found accurately.

An example of a filter for finding a linear pattern is disclosed in U.S. Pat. No. 4,769,850. However, with the disclosed filter, the results of the filtering process are obtained which depend on the image density of the areas surrounding a linear pattern. Specifically, the problem occurs in that the sensitivity, with which a linear pattern is found, varies for a linear pattern located in a high image density region of a radiation image and a linear pattern located in a low image density region of a radiation image.

Another example of a filter for finding a linear pattern is described in "Discrimination of Blood Vessel Patterns in X-ray Fluorographic Image of the Chest" by Jun-ichi Hasegawa, et al., Medical Electronics And Somatology, pp. 36–42, September 1984. However, this linear pattern finding filter has directional properties. Specifically, with this linear pattern finding filter, only a linear pattern extending along a specific direction is discriminated. Therefore, this linear pattern finding filter is not suitable for the discrimination of linear patterns, such as blood vessel patterns, which extend in various different directions.

SUMMARY OF THE INVENTION

The primary object of the present invention is to provide a pattern finding apparatus, wherein a linear pattern finding filter is employed, which has no directional property and is not adversely affected by the image density of areas surrounding a linear pattern, and an accurate judgment can be made as to whether a predetermined picture element P0 in a radiation image falls or does not fall within the region corresponding to a linear pattern in the radiation image.

Another object of the present invention is to provide a linear pattern width calculating apparatus, wherein a calculation is made to find the width of a linear pattern, which may appear in a radiation image.

A further object of the present invention is to provide an abnormal pattern detecting apparatus, wherein an abnormal pattern, which may appear as an approximately circular pattern in a radiation image, can be accurately discriminated from a linear pattern appearing in the radiation image and can thereby be detected accurately.

A still further object of the present invention is to provide an abnormal pattern detecting apparatus, wherein no part of a linear pattern, such as a blood vessel pattern, is detected by mistake as an abnormal pattern, and only a true abnormal pattern can be detected accurately.

The present invention provides a first pattern finding apparatus comprising:
i) an image signal component finding means for obtaining an image signal, which is made up of a series of image signal components representing a radiation image of an object, and finding from said image signal:
a) the value Q0 of an image signal component representing a predetermined picture element P0 in said radiation image, or
a mean-level value Q0 of the values of image signal components representing a plurality of picture elements, which are located in a center region including said predetermined picture element P0, and
b) the values Qi of image signal components representing a plurality of picture elements Pi, each of which is located on each of a plurality of lines Li, where i=1, 2, . . . , n, extending from said predetermined picture element P0 to peripheral parts of said radiation image, and each of which is spaced a predetermined distance r from said predetermined picture element P0, or
mean-level values Qi, each representing the mean level of the values of image signal components representing a plurality of picture elements located in each of a plurality of peripheral regions, each said peripheral region including each of said picture elements Pi,
ii) a difference calculating means for calculating the differences Δi between said value Q0 or said mean-level value Q0 and the respective values Qi or the respective mean-level values Qi, and
iii) a maximum value finding means for finding the maximum value Δmax of said differences Δi,
wherein said maximum value is taken as an output value.

The present invention also provides a second pattern finding apparatus comprising:
i) an image signal component finding means for obtaining an image signal, which is made up of a series of image signal components representing a radiation image of an object, and finding from said image signal:
a) the value Q0 of an image signal component representing a predetermined picture element P0 in said radiation image, or
a mean-level value Q0 of the values of image signal components representing a plurality of picture elements, which are located in a center region including said predetermined picture element P0, and
b) the values Qi of image signal components representing a plurality of picture elements Pi, each of which is located on each of a plurality of lines Li, where i=1, 2, . . . , n, extending from said predetermined picture element P0 to peripheral parts of said radiation image, and each of which is spaced a predetermined distance r from said predetermined picture element P0, or
mean-level values Qi, each representing the mean level of the values of image signal components representing a plurality of picture elements located in each of a plurality of peripheral regions, each said peripheral region including each of said picture elements Pi,
ii) a first difference calculating means for calculating the differences Δi between said value Q0 or said mean-level value Q0 and the respective values Qi or the respective mean-level values Qi,
iii) a second difference calculating means for:
grouping the two differences Δj and Δk into a single set, two said differences having been calculated for each set of two lines Lj and Lk, where j=1, 2, ..., n and k=1, 2, ..., n, which are among the plurality of said lines Li and extend from said predetermined picture element P0 in approximately opposite directions, calculating the sum $\Delta j+\Delta k$ of two said differences $\Delta j$, $\Delta k$ and the absolute value of the difference therebetween, $|\Delta j-\Delta k|$, for each set of two said differences, and thereafter calculating the difference $\Delta jk$ between said sum $\Delta j+\Delta k$ and said absolute value $|\Delta j-\Delta k|$ for each set of two said differences, and iv) a maximum value finding means for finding the maximum value $\Delta max$ of said differences $\Delta jk$, which have been calculated for a plurality of said sets of differences, wherein said maximum value is taken as an output value.

The present invention further provides a third pattern finding apparatus comprising:

i) an image signal component finding means for obtaining an image signal, which is made up of a series of image signal components representing a radiation image of an object, and finding from said image signal:

a) the value Q0 of an image signal component representing a predetermined picture element P0 in said radiation image, or a mean-level value Q0 of the values of image signal components representing a plurality of picture elements, which are located in a center region including said predetermined picture element P0, and b) the values Qi of image signal components representing a plurality of picture elements Pi, each of which is located on each of a plurality of lines Li, where i=1, 2, ..., n, extending from said predetermined picture element P0 to peripheral parts of said radiation image, and each of which is spaced a predetermined distance r from said predetermined picture element P0, or mean-level values Qi, each representing the mean level of the values of image signal components representing a plurality of picture elements located in each of a plurality of peripheral regions, each said peripheral region including each of said picture elements Pi, ii) a first difference calculating means for calculating the differences $\Delta i$ between said value Q0 or said mean-level value Q0 and the respective values Qi or the respective mean-level values Qi, iii) a second difference calculating means for:

grouping the two differences $\Delta j$ and $\Delta k$ into a single set, two said differences having been calculated for each set of two lines Lj and Lk, where j=1, 2, ..., n and k=1, 2, ..., n, which are among the plurality of said lines Li and extend from said predetermined picture element P0 in approximately opposite directions, calculating the sum $\Delta j+\Delta k$ of two said differences $\Delta j$, $\Delta k$ and the absolute value of the difference therebetween, $|\Delta j-\Delta k|$, for each set of two said differences, and thereafter calculating the difference $\Delta jk$ between said sum $\Delta j+\Delta k$ and said absolute value $|\Delta j-\Delta k|$ for each set of two said differences, iv) a maximum value finding means for finding the maximum value $\Delta max$ of said differences $\Delta jk$, which have been calculated for a plurality of said sets of differences, v) a minimum value finding means for finding the minimum value $\Delta min$ of said differences $\Delta jk$, which have been calculated for the plurality of said sets of differences, and vi) a third difference calculating means for calculating the difference $\Delta$ between said maximum value $\Delta max$ and said minimum value $\Delta min$, wherein said difference $\Delta$ is taken as an output value.

In the first, second, and third pattern finding apparatuses in accordance with the present invention, the length of the predetermined distance r should preferably be varied among a plurality of predetermined distances r. The output value is then obtained for each of the plurality of said predetermined distances r. The maximum value of the output values, which have thus been obtained for the plurality of said predetermined distances r, is taken as a new output value.

The term "mean-level value" as used herein means a value which represents a mean level of the values of image signal components representing a plurality of picture elements. By way of example, the term "mean-level value" as used herein means the mean value of the values of image signal components, the median value of the values of image signal components, or the middle value between the maximum value and the minimum value of the values of image signal components.

With the first pattern finding apparatus in accordance with the present invention, the image signal component finding means finds the value Q0 of the image signal component representing the predetermined picture element P0 in the radiation image, or the mean-level value Q0 of the values of image signal components representing a plurality of picture elements, which are located in the center region including the predetermined picture element P0. The image signal component finding means also finds the values Qi of image signal components representing a plurality of picture elements Pi, which are located around the predetermined picture element P0, or the mean-level values Qi, each of which represents the mean level of the values of image signal components representing a plurality of picture elements located in each of a plurality of peripheral regions, each said peripheral region including each of the picture elements Pi. The difference calculating means calculates the differences $\Delta i$ between the value Q0 or the mean-level value Q0 and the respective values Qi or the respective mean-level values Qi. The maximum value $\Delta max$ of the differences $\Delta i$ is then found and taken as an output value. Therefore, the first pattern finding apparatus in accordance with the present invention has no directional property, but has uniform sensitivity with respect to linear patterns extending in various different directions. Also, with the first pattern finding apparatus in accordance with the present invention wherein the aforesaid differences are calculated, no adverse effect occurs from the image density of areas surrounding a linear pattern, and an accurate judgment can be made as to whether a predetermined picture element P0 in a radiation image falls or does not fall within the region corresponding to a linear pattern in the radiation image.

With the second pattern finding apparatus in accordance with the present invention, as in the first pattern finding apparatus in accordance with the present invention, the image signal component finding means finds the value Q0 or the mean-level value Q0, and the values Qi or the mean-level values Qi. The first difference calculating means calculates the differences $\Delta i$ between the value Q0 or the mean-level value Q0 and the respective values Qi or the respective mean-level values Qi. The second difference calculating means groups the two differences $\Delta j$ and $\Delta k$ into a single set, two said differences having been calculated for each set of two lines Lj and Lk, which are among the plurality of the lines Li and extend from the predetermined picture element P0 in approximately opposite directions. Thereafter, for each set of the two differences, the second difference calculating means calculates the difference Δjk from the formula $$\Delta jk = \Delta j + \Delta k - |\Delta j - \Delta k|$$

Thereafter, the maximum value finding means finds the maximum value Δmax of the differences Δjk, which have been calculated for a plurality of the sets of differences. The maximum value thus found is taken as an output value. Therefore, as in the first pattern finding apparatus in accordance with the present invention, the second pattern finding apparatus in accordance with the present invention has no directional property and is not adversely affected by the image density of areas surrounding a linear pattern. Also, the second pattern finding apparatus in accordance with the present invention is free of the problem in that a boundary line, such as the boundary line between the lung field and the heart or the boundary line between the lung field and the diaphragm in an X-ray image of the chest of a human body, is detected by mistake as a linear pattern. Only a pattern, such as a blood vessel pattern, defined by boundary lines extending approximately in parallel is detected as a linear pattern. Accordingly, a linear pattern can be detected more accurately.

With the third pattern finding apparatus in accordance with the present invention, the second pattern finding apparatus in accordance with the present invention is modified such that the minimum value finding means finds the minimum value Δmin of the differences Δjk, which have been calculated for the plurality of the sets of differences. Thereafter, the third difference calculating means calculates the difference Δ from the formula $$\Delta = \Delta max - \Delta min$$

The difference Δ thus calculated is taken as an output value. Therefore, as in the first pattern finding apparatus in accordance with the present invention, the third pattern finding apparatus in accordance with the present invention has no directional property and is not adversely affected by the image density of areas surrounding a linear pattern. Also, as in the second pattern finding apparatus in accordance with the present invention, the third pattern finding apparatus in accordance with the present invention is free of the problem in that no boundary line is detected by mistake as a linear pattern. As an additional feature of the second pattern finding apparatus in accordance with the present invention, the problem can be prevented from occurring in that a circular pattern, which has approximately the same diameter as the width of a linear pattern to be detected, is detected by mistake as a linear pattern. Accordingly, only a linear pattern can be detected very accurately.

As described above, in the first, second, and third pattern finding apparatuses in accordance with the present invention, the length of the predetermined distance r should preferably be varied among a plurality of predetermined distances r. The output value is then obtained for each of the plurality of the predetermined distances r. The maximum value of the output values, which have thus been obtained for the plurality of the predetermined distances r, is taken as a new output value. In such cases, linear patterns having various different widths can be detected accurately.

The present invention still further provides a linear pattern width calculating apparatus, wherein the width of a linear pattern is calculated from an image signal representing a radiation image, in which the linear pattern is embedded, the width of the linear pattern being taken at the position at which a predetermined picture element falling within the region corresponding to the linear pattern is located, the linear pattern width calculating apparatus comprising:
i) a first distance calculating means for: finding an intersection of each of a plurality of lines, which extend from said predetermined picture element toward edges of said radiation image such that two lines extending from said predetermined picture element in opposite directions may be grouped into a single set and a plurality of sets of lines may thus be obtained, and either one of boundary lines defining said linear pattern, and thereafter calculating the distance between each of the intersections, which have thus been found, and said predetermined picture element, ii) a second distance calculating means for adding two distances, which have been calculated for each set of two said lines, and thereby calculating the distance between the two intersections for each set of two said lines, and iii) a finding means for:

finding the minimum distance from a plurality of said distances, each of which has been calculated between the two intersections for each set of two said lines, and determining said minimum distance as the width of said linear pattern, which width is taken at the position at which said predetermined picture element is located.

The linear pattern width calculating apparatus in accordance with the present invention is provided with the first distance calculating means for finding an intersection of each of a plurality of lines, which extend from the predetermined picture element toward edges of the radiation image such that two lines extending from the predetermined picture element in opposite directions may be grouped into a single set and a plurality of sets of lines may thus be obtained, and either one of boundary lines defining the linear pattern. The first distance calculating means thereafter calculates the distance between each of the intersections, which have thus been found, and the predetermined picture element. The linear pattern width calculating apparatus in accordance with the present invention is also provided with the second distance calculating means for adding two distances, which have been calculated for each set of the two lines, and thereby calculates the distance between the two intersections for each set of the two lines. The linear pattern width calculating apparatus in accordance with the present invention is also provided with the finding means for finding the minimum distance from a plurality of the distances, each of which has been calculated between the two intersections for each set of the two lines. The finding means determines the minimum distance as the width of the linear pattern, which width is taken at the position at which the predetermined picture element is located. Therefore, with the linear pattern width calculating apparatus in accordance with the present invention, the width of a linear pattern in a radiation image can be calculated accurately.

The calculation of the width of a linear pattern is necessary when a disease, the sign of which may appear on a linear pattern, such as a blood vessel pattern, is to be diagnosed automatically or when a tumor pattern and a blood vessel pattern are to be discriminated from each other as in an embodiment, which will be described later.

The present invention also provides a first abnormal pattern detecting apparatus wherein, from an image signal made up of a series of image signal components representing a radiation image of an object, an abnormal pattern appearing as an approximately circular pattern in the radiation image is detected, the abnormal pattern detecting apparatus comprising:
i) a first finding means for finding a prospective abnormal pattern, which may appear in said radiation image, by processing said image signal representing said radiation image with a first filter, which is constituted such that it can find an approximately circular pattern,
ii) a second finding means for finding a linear pattern, which may appear in said radiation image, by processing said image signal representing said radiation image with a second filter, which is constituted such that it can find a linear pattern or a linear pattern the width and the length of which are approximately equal to each other, said linear pattern appearing in said radiation image, and
iii) a judgment means for:
a) selecting an enlarged prospective abnormal pattern region in an area in said radiation image, in which area both said prospective abnormal pattern and said linear pattern have been found, said enlarged prospective abnormal pattern region including said prospective abnormal pattern and extending to parts in the vicinity of said prospective abnormal pattern,
b) calculating the area of said linear pattern falling within said enlarged prospective abnormal pattern region and the maximum width of said linear pattern falling within said enlarged prospective abnormal pattern region, and
c) from the area and the maximum width of said linear pattern falling within said enlarged prospective abnormal pattern region, judging whether said prospective abnormal pattern is or is not a true abnormal pattern.

By way of example, the linear pattern may be a blood vessel pattern or one of other patterns, such as a rib pattern, appearing in a radiation image of a human body.

Ordinarily, filters for detecting abnormal patterns, such as tumor patterns, are designed such that they can detect only the abnormal patterns as accurately as possible. Also, filters for detecting linear patterns, such as blood vessel patterns, are ordinarily designed such that they can detect only the linear patterns as accurately as possible.

However, with the first abnormal pattern detecting apparatus in accordance with the present invention, a filter for detecting an abnormal pattern and a filter for detecting a linear pattern are employed, which filters may not work very accurately. After patterns are detected by processing the image signal representing the radiation image with the two filters, a judgment is made as to whether each pattern is an abnormal pattern or a linear pattern. Specifically, the first filter of the first abnormal pattern detecting apparatus in accordance with the present invention works to find primarily an abnormal pattern as a prospective abnormal pattern but is allowed to find, for example, a pattern of a branch point of a blood vessel as a prospective abnormal pattern. The second filter works to find a linear pattern or a linear pattern the width and the length of which are approximately equal to each other, e.g. an abnormal pattern or a pattern approximating an abnormal pattern. The judgment means selects an enlarged prospective abnormal pattern region in an area in the radiation image, in which area both the prospective abnormal pattern and the linear pattern have been found. The judgment means then calculates the area of the linear pattern falling within the enlarged prospective abnormal pattern region and the maximum width of the linear pattern falling within the enlarged prospective abnormal pattern region. From the area and the maximum width of the linear pattern falling within the enlarged prospective abnormal pattern region, a judgment is made as to whether the prospective abnormal pattern is or is not a true abnormal pattern. Therefore, an abnormal pattern and a linear pattern, such as a pattern of a branch point of a blood vessel or a pattern of a blood vessel, which extends in the direction normal to the plane of the radiation image, the linear pattern being almost indistinguishable from an abnormal pattern, can be accurately discriminated from each other. Accordingly, an abnormal pattern can be detected accurately.

The present invention further provides a second abnormal pattern detecting apparatus wherein, from an image signal made up of a series of image signal components representing a radiation image of an object, an abnormal pattern appearing as an approximately circular pattern in the radiation image is detected, the abnormal pattern detecting apparatus comprising:
i) an abnormal pattern emphasizing means for forming a first abnormal pattern emphasized image, in which an abnormal pattern has been emphasized by processing said image signal representing said radiation image with an abnormal pattern emphasizing filter,
ii) a linear pattern emphasizing means for forming a linear pattern emphasized image, in which a linear pattern extending in said radiation image has been emphasized by processing said image signal representing said radiation image with a linear pattern emphasizing filter,
iii) a difference calculating means for forming a second abnormal pattern emphasized image, wherein the emphasis of regions, which were emphasized in both said first abnormal pattern emphasized image and said linear pattern emphasized image, has been canceled from said first abnormal pattern emphasized image, and
iv) an abnormal pattern finding means for finding said abnormal pattern from said second abnormal pattern emphasized image.

The present invention still further provides a third abnormal pattern detecting apparatus wherein, from an image signal made up of a series of image signal components representing a radiation image of an object, an abnormal pattern appearing as an approximately circular pattern in the radiation image is detected, the abnormal pattern detecting apparatus comprising:
i) a linear pattern emphasizing means for forming a linear pattern emphasized image, in which a linear pattern extending in said radiation image has been emphasized by processing said image signal representing said radiation image with a linear pattern emphasizing filter,
ii) a difference calculating means for forming a linear pattern degenerated image, which represents the difference between said radiation image and said linear pattern emphasized image,
iii) an abnormal pattern emphasizing means for forming an abnormal pattern emphasized image, in which an abnormal pattern has been emphasized by processing an image signal representing said linear pattern degenerated image with an abnormal pattern emphasizing filter, and
iv) an abnormal pattern finding means for finding said abnormal pattern from said abnormal pattern emphasized image.

The present invention also provides a fourth abnormal pattern detecting apparatus wherein, from an image signal made up of a series of image signal components representing a radiation image of an object, an abnormal pattern appearing as an approximately circular pattern in the radiation image is detected, the abnormal pattern detecting apparatus comprising:
i) an abnormal pattern emphasizing means for forming a first abnormal pattern emphasized image, in which an abnormal pattern has been emphasized by processing said image signal representing said radiation image with an abnormal pattern emphasizing filter,
ii) a linear pattern emphasizing means for forming a linear pattern emphasized image, in which only the linear pattern that was emphasized in said first abnormal pattern emphasized image has been emphasized by processing an image signal representing said first abnormal pattern emphasized image with a linear pattern emphasizing filter,
iii) a difference calculating means for forming a second abnormal pattern emphasized image, which represents the difference between said first abnormal pattern emphasized image and said linear pattern emphasized image, and
iv) an abnormal pattern finding means for finding said abnormal pattern from said second abnormal pattern emphasized image.

The second abnormal pattern detecting apparatus in accordance with the present invention is provided with the abnormal pattern emphasizing means for forming a first abnormal pattern emphasized image, in which an abnormal pattern has been emphasized by processing the image signal representing the radiation image with an abnormal pattern emphasizing filter. The second abnormal pattern detecting apparatus in accordance with the present invention is also provided with the linear pattern emphasizing means for forming a linear pattern emphasized image, in which a linear pattern extending in the radiation image has been emphasized by processing the image signal representing the radiation image with a linear pattern emphasizing filter. The difference calculating means works in order to form a second abnormal pattern emphasized image, wherein the emphasis of regions, which were emphasized in both the first abnormal pattern emphasized image and the linear pattern emphasized image, has been canceled from the first abnormal pattern emphasized image. Thereafter, the abnormal pattern finding means finds the abnormal pattern from the second abnormal pattern emphasized image. Therefore, with the second abnormal pattern detecting apparatus in accordance with the present invention, no part of a linear pattern is found by mistake as an abnormal pattern. Accordingly, an abnormal pattern can be detected accurately.

The third abnormal pattern detecting apparatus in accordance with the present invention is provided with the linear pattern emphasizing means for forming a linear pattern emphasized image, in which a linear pattern extending in the radiation image has been emphasized by processing the image signal representing the radiation image with a linear pattern emphasizing filter. The third abnormal pattern detecting apparatus in accordance with the present invention is provided with the difference calculating means for forming a linear pattern degenerated image, which represents the difference between the radiation image and the linear pattern emphasized image. The abnormal pattern emphasizing means works in order to form an abnormal pattern emphasized image, in which an abnormal pattern has been emphasized by processing an image signal representing the linear pattern degenerated image with an abnormal pattern emphasizing filter. Thereafter, the abnormal pattern finding means finds the abnormal pattern from the abnormal pattern emphasized image. Therefore, with the third abnormal pattern detecting apparatus in accordance with the present invention, as in the second abnormal pattern detecting apparatus in accordance with the present invention, no part of a linear pattern is found by mistake as an abnormal pattern. Accordingly, an abnormal pattern can be detected accurately.

The fourth abnormal pattern detecting apparatus in accordance with the present invention is provided with the abnormal pattern emphasizing means for forming a first abnormal pattern emphasized image, in which an abnormal pattern has been emphasized by processing the image signal representing the radiation image with an abnormal pattern emphasizing filter. The fourth abnormal pattern detecting apparatus in accordance with the present invention is also provided with the linear pattern emphasizing means for forming a linear pattern emphasized image, in which only the linear pattern that was emphasized in the first abnormal pattern emphasized image has been emphasized by processing an image signal representing the first abnormal pattern emphasized image with a linear pattern emphasizing filter. The difference calculating means works in order to form a second abnormal pattern emphasized image, which represents the difference between the first abnormal pattern emphasized image and the linear pattern emphasized image. Thereafter, the abnormal pattern finding means finds the abnormal pattern from the second abnormal pattern emphasized image. Therefore, with the fourth abnormal pattern detecting apparatus in accordance with the present invention, as in the second and third abnormal pattern detecting apparatuses in accordance with the present invention, no linear pattern is found by mistake as an abnormal pattern. Accordingly, an abnormal pattern can be detected accurately.

BRIEF DESCRIPTION OF THE DRAWINGS

FIGS. 12A, 12B, and 12C are block diagrams showing embodiments of the second, third, and fourth abnormal pattern detecting apparatuses in accordance with the present invention.

DESCRIPTION OF THE PREFERRED EMBODIMENTS

The present invention will hereinbelow be described in further detail with reference to the accompanying drawings.

First, embodiments of the pattern finding apparatus in accordance with the present invention will be described hereinbelow. In these embodiments, an X-ray image of the chest of a human body is stored on a stimulable phosphor sheet, and a blood vessel pattern appearing in the X-ray image is found.

Figure 4:
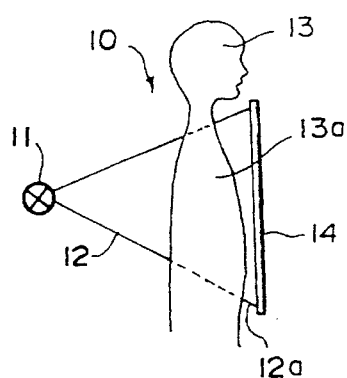
FIG. 4 is a schematic view showing an example of an X-ray image recording apparatus.

FIG. 4 is a schematic view showing an example of an X-ray image recording apparatus.

With reference to FIG. 4, X-rays 12 are produced by an X-ray source 11 of an X-ray image recording apparatus 10 and irradiated to the chest 13a of a human body 13. X-rays 12a, which have passed through the human body 13, impinge upon a stimulable phosphor sheet 14. In this manner, an X-ray image of the chest 13a of the human body 13 is stored on the stimulable phosphor sheet 14.

Figure 5:
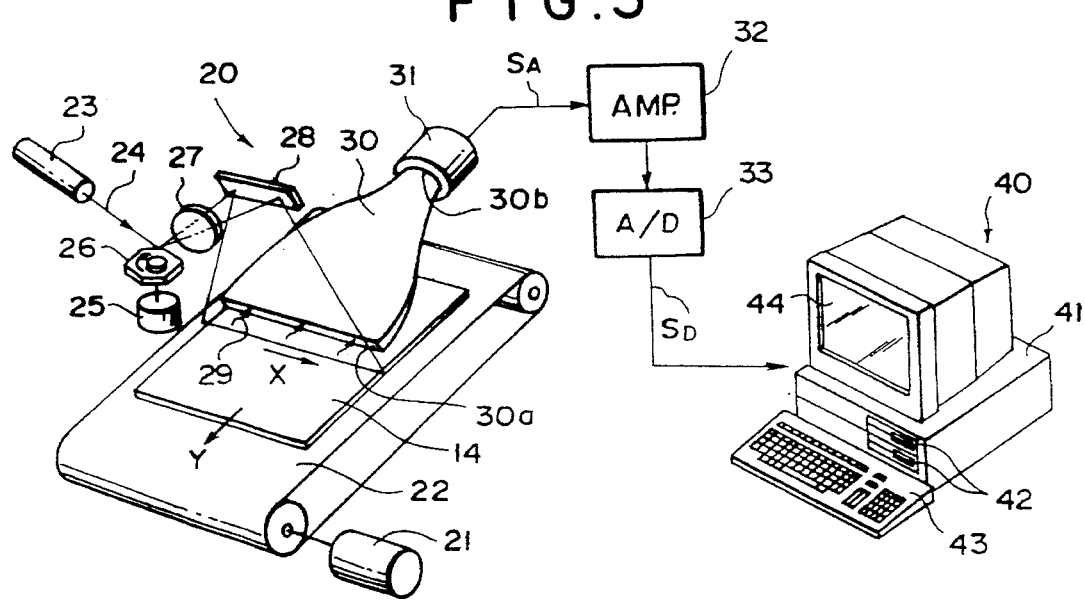
FIG. 5 is a perspective view showing an example of an X-ray image read-out apparatus and a computer system which is provided with an embodiment of the pattern finding apparatus in accordance with the present invention.

FIG. 5 is a perspective view showing an example of an X-ray image read-out apparatus and a computer system which is provided with an embodiment of the pattern finding apparatus in accordance with the present invention.

After the image recording operation is carried out with the X-ray image recording apparatus 10 shown in FIG. 4, the stimulable phosphor sheet 14, on which the X-ray image has been stored, is set at a predetermined position in an X-ray image read-out apparatus 20 shown in FIG. 5.

The stimulable phosphor sheet 14, on which the X-ray image has been stored and which has been placed at the predetermined position in the X-ray image read-out apparatus 20, is conveyed in a sub-scanning direction indicated by the arrow Y by a sheet conveyance means 22. The sheet conveyance means 22 may be constituted of an endless belt, or the like, and is operated by a motor 21. A laser beam 24, which serves as stimulating rays, is produced by a laser beam source 23, and is reflected and deflected by a rotating polygon mirror 26, which is quickly rotated by a motor 25 in the direction indicated by the arrow. The laser beam 24 then passes through a converging lens 27, which may be constituted of an fθ lens, or the like. The direction of the optical path of the laser beam 24 is then changed by a mirror 28, and the laser beam 24 impinges upon the stimulable phosphor sheet 14 and scans it in a main scanning direction indicated by the arrow X, which direction is approximately normal to the sub-scanning direction indicated by the arrow Y. When the stimulable phosphor sheet 14 is exposed to the laser beam 24, the exposed portion of the stimulable phosphor sheet 14 emits light 29 in an amount proportional to the amount of energy stored thereon during its exposure to the X-rays. The emitted light 29 is guided by a light guide member 30 and photoelectrically detected by a photomultiplier 31. The light guide member 30 is made from a light guiding material, such as an acrylic plate, and has a linear light input face 30a, positioned so that it extends along the main scanning line on the stimulable phosphor sheet 14, and a ring-shaped light output face 30b, positioned so that it is in close contact with a light receiving face of the photomultiplier 31. The emitted light 29, which has entered the light guide member 30 at its light input face 30a, is guided through repeated total reflection inside of the light guide member 30, emanates from the light output face 30b, and is received by the photomultiplier 31. In this manner, the amount of the emitted light 29, which amount represents the X-ray image, is converted into an electric signal by the photomultiplier 31.

An analog output signal SA generated by the photomultiplier 31 is logarithmically amplified by a logarithmic amplifier 32, and digitized by an A/D converter 33 into an electric image signal SD.

The image signal SD is then fed into a computer system 40. The computer system 40 is provided with an embodiment of the pattern finding apparatus in accordance with the present invention. The computer system 40 comprises a main body 41 in which a CPU and an internal memory are incorporated, a disk drive unit 42 which operates a floppy disk serving as a subsidiary memory, a keyboard 43 from which necessary instructions, or the like, are fed into the computer system 40, and a CRT display device 44 which displays necessary information.

In the computer system 40, a blood vessel pattern appearing in the X-ray image represented by the image signal SD is found. An X-ray image, in which the blood vessel pattern has been emphasized, is displayed on the CRT display device 44 and utilized in making a diagnosis. In these embodiments, the blood vessel pattern is found by executing the software functions of the computer system 40 in the manner which will be described later. Therefore, in these embodiments, the image signal component finding means, the difference calculating means, the maximum value finding means, and the minimum value finding means of the first, second, and third pattern finding apparatuses in accordance with the present invention are constituted of the combinations of corresponding hardware functions and corresponding software functions of the computer system 40.

A method for finding a blood vessel pattern using the computer system 40 will now be described hereinbelow.

Figure 1:
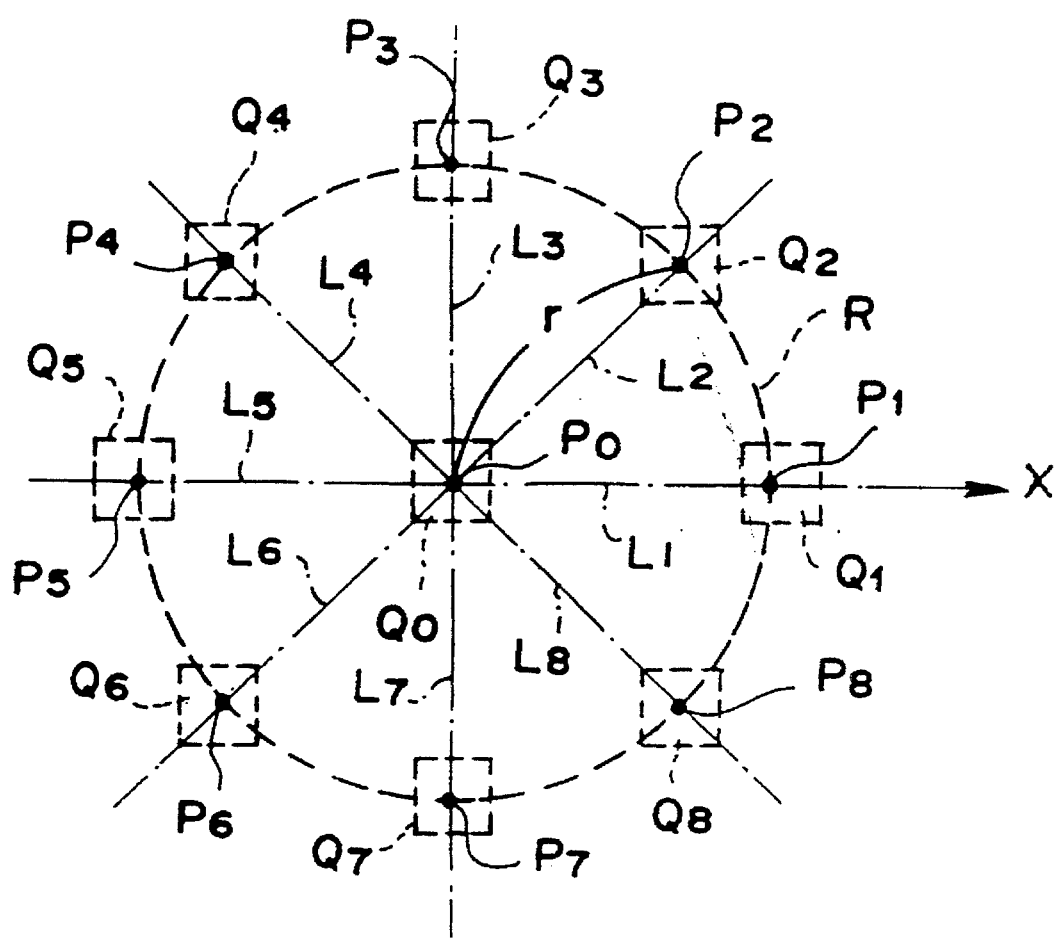
FIG. 1 is a diagram having a predetermined picture element P0 from an X-ray image in the middle, which diagram serves as an aid in explaining how a spatial-domain filter works during the operations for finding a blood vessel pattern.

FIG. 1 is a diagram having a predetermined picture element P0 from an X-ray image in the middle, which diagram serves as an aid in explaining how a spatial-domain filter works during the operations for finding a blood vessel pattern.

A judgment is made as to whether a predetermined picture element P0 in the X-ray image falls or does not fall within the region corresponding to a blood vessel pattern appearing in the X-ray image. The blood vessel pattern appearing in the X-ray image can be found by processing the image signal components of the image signal representing the picture elements of the X-ray image with the filter illustrated in FIG. 1.

Figure 2:
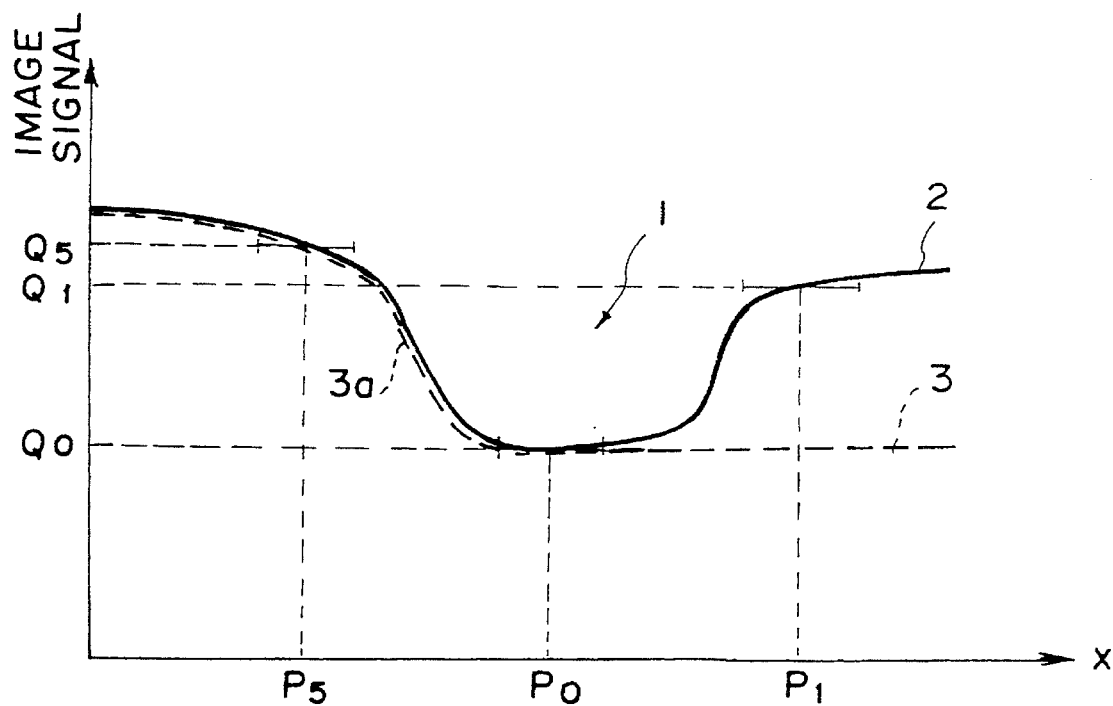
FIG. 2 is a graph showing an example of the profile of an X-ray image around a predetermined picture element P0 in the direction (x direction) along which the lines L1 and L5 shown in FIG. 1 extend.
Figure 3:
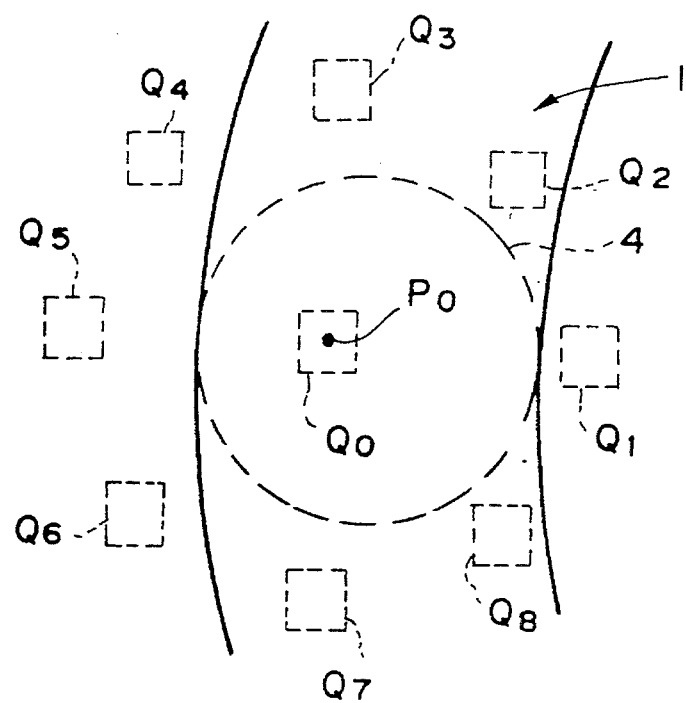
FIG. 3 is a diagram showing a blood vessel pattern and the spatial-domain filter of FIG. 1.

FIG. 2 is a graph showing an example of the profile of an X-ray image around a predetermined picture element P0 in the direction (x direction) along which the lines L1 and L5 shown in FIG. 1 extend. FIG. 3 is a diagram showing a blood vessel pattern and the spatial-domain filter of FIG. 1. In this example, the predetermined picture element P0 is located approximately in the middle of a blood vessel pattern 1.

As illustrated in FIG. 1, a plurality of (in this case, eight) imaginary lines Li, where i=1, 2, ..., 8, extend from the predetermined picture element P0 in the X-ray image to the peripheral parts of the X-ray image. Also, an imaginary circle R having a radius r extends around the predetermined picture element P0. Thereafter, an area of a center region Q0 which includes the predetermined picture element P0 is selected. Also, areas of peripheral regions Qi are selected which peripheral regions respectively include picture elements Pi (i=1, 2, ..., 8) located at the intersections of the lines Li (i=1, 2, ..., 8) and the circle R. The radius r, the area of the center region Q0, and the areas and number of the peripheral regions Qi are selected appropriately in accordance with the thickness of the blood vessel pattern which is to be found, the level of noise components contained in the X-ray image, the level of accuracy required of the finding, the speed with which the operations must be carried out, or the like.

Thereafter, a calculation is made to find a mean-level value Q0 of the values of image signal components representing a plurality of picture elements, which are located in the center region Q0. Also, calculations are made to find mean-level values Qi, where i=1, 2, ..., 8, each representing the mean level of the values of image signal components representing a plurality of picture elements located in each of the peripheral regions Qi. As an aid in facilitating the explanation, Q0 represents both the center region and the mean-level value of the values of image signal components representing the picture elements, which are located in the center region. Also, Qi, where i=1, 2, ..., 8, represents both the peripheral regions and the mean-level values representing the mean level of the values of the image signal components representing the picture elements, which are located in each of the peripheral regions.

In the manner described above, the mean-level value Q0 of the values of image signal components corresponding to the center region Q0 and the mean-level values Qi, each of which represents the mean level of the values of image signal components corresponding to each of the peripheral regions Qi, are calculated. Thereafter, the differences $\Delta i$ between the mean-level value Q0 and the respective mean-level values Qi are calculated with the formula $$\Delta i = Qi - Q0 \qquad (1)$$

The maximum value $\Delta max$ of the differences $\Delta i$ is then found, which is expressed as $$\Delta max = MAX(\Delta i) \qquad (2)$$

The maximum value $\Delta max$ is taken as an output value corresponding to the predetermined picture element P0. Such a blood vessel pattern finding filter has uniform sensitivity for every direction from the predetermined picture element P0. By taking the maximum value $\Delta max$ as the value of the image signal component corresponding to the predetermined picture element P0 and carrying out the aforesaid operations for every picture element in the X-ray image, an X-ray image in which the blood vessel pattern has been emphasized can be obtained. Also, by comparing the maximum value $\Delta max$ with a predetermined threshold value Th1 and sampling only the picture elements, which are associated with the condition $\Delta max \leq Th1$, the blood vessel pattern can be detected.

However, with the aforesaid embodiment, in cases where $\Delta max = \Delta 5$, the same output value is obtained for an image having a profile indicated by the solid line 2 in FIG. 2 and an image having a profile indicated by the broken line 3 in FIG. 2. Specifically, the same results of judgment are obtained when the predetermined picture element P0 is located in the region corresponding to the blood vessel pattern 1 and when the predetermined picture element P0 is located in the vicinity of a boundary line 3a.

In an embodiment described below, operations are carried out such that the aforesaid problems may be eliminated.

In this embodiment, in the same manner as that in the aforesaid embodiment, the mean-level value Q0 of the values of image signal components corresponding to the center region Q0 and the mean-level values Qi, each of which represents the mean level of the values of image signal components corresponding to each of the peripheral regions Qi, are calculated. Also, the differences $\Delta i$ between the mean-level value Q0 and the respective mean-level values Qi are calculated with Formula (1). Thereafter, two peripheral regions located on each set of two lines, which are among the plurality of the lines Li, where i=1, 2, ..., 8, shown in FIG. 1 and which extend from the predetermined picture element P0 in opposite directions, are grouped into a single set. Specifically, the peripheral regions Q1 and Q5 are grouped into a single set. Also, the peripheral regions Q2 and Q6, the peripheral regions Q3 and Q7, and the peripheral regions Q4 and Q8 are respectively grouped into sets. For each set of the two peripheral regions, the difference $\Delta i, i+4$, where i=1, 2, 3, 4, is calculated with the formula $$\Delta i, i+4 = \Delta i + \Delta i+4 - |\Delta i - \Delta i+4| \qquad (3)$$

The maximum value $\Delta max$ of the differences $\Delta i, i+4$, which have been calculated for the plurality of the sets of peripheral regions, is then found. The maximum value is expressed as $$\Delta max = MAX(\Delta i, i+4) \qquad (4)$$

When i=1, Formula (3) gives $$\Delta 1,5 = \Delta 1 + \Delta 5 - |\Delta 1 - \Delta 5| \qquad (5)$$

As for the image having the profile indicated by the solid line 2 in FIG. 2, the mean-level values Q1 and Q5 are nearly equal to each other, and therefore $\Delta 1 \approx \Delta 5$. Accordingly, $$|\Delta 1 - \Delta 5| \approx 0$$

and Formula (5) gives $$\Delta 1,5 \approx 2Q1 - 2Q0 \qquad (6)$$

On the other hand, as for the image having the profile indicated by the broken line 3 in FIG. 2, the mean-level values Q1 and Q5 differ markedly from each other. Therefore, by way of example, when it is assumed that the mean-level value Q5 is nearly equal to the mean-level value Q0, $\Delta 5 \approx 0$. Accordingly, the following formula obtains:

$$\Delta 1,5 \approx 0 \qquad (7)$$

Specifically, by carrying out the operations expressed as Formulas (3) and (4), the problem can be prevented from occurring in that a boundary line is found as a blood vessel pattern.

However, with this embodiment, the same output value is also obtained for an approximately circular pattern, such as a tumor pattern 4, the diameter of which is approximately equal to the width of the blood vessel pattern 1 shown in FIG. 3. Therefore, not only a blood vessel pattern extending in an X-ray image is found, but an approximately circular pattern is also detected as a blood vessel pattern. An example of such problems will be described hereinbelow. With reference to FIGS. 2 and 3, in cases where the predetermined picture element P0 is located approximately at the middle of the blood vessel pattern 1 and the conditions $$Q0=Q2=Q3=Q7=Q8 \tag{8}$$

$$Q1=Q4=Q5=Q6 \tag{9}$$

are satisfied, the formula $$\Delta1,5 \approx 2Q1-2Q0 \tag{6}$$

obtains. Also, the formula $$\Delta26=\Delta37=\Delta48=0 \tag{10}$$

obtains. Therefore, $$\Delta max=\Delta15=2Q1-2Q0 \tag{11}$$

On the other hand, in cases where the predetermined picture element P0 is located approximately at the middle of the tumor pattern 4 shown in FIG. 3 and the conditions $$Q1=Q2=Q3=Q4=Q5=Q6=Q7=Q8 \tag{12}$$

are satisfied, Formula (3) gives $$\Delta15=\Delta26=\Delta37=\Delta48=2Q1-2Q0 \tag{13}$$

Therefore, as in Formula (11), the maximum value $\Delta max$ is expressed as $$\Delta max=2Q1-2Q0 \tag{14}$$

Specifically, with this filter, the blood vessel pattern 1 and the tumor pattern 4 shown in FIG. 3 cannot be discriminated from each other.

In an embodiment described below, operations are carried out such that the problems may be prevented from occurring in that an approximately circular pattern is found as a blood vessel pattern.

In this embodiment, in the same manner as that of Formulas (3) and (4), operations are carried out with the formulas $$\Delta i,i+4=\Delta i+\Delta i+4-|\Delta i-\Delta i+4| \tag{15}$$

$$\Delta max=MAX(\Delta i,i+4) \tag{16}$$

Also, the minimum value of the differences $\Delta i,i+4$, which have been calculated for the plurality of the sets of peripheral regions, is then found. The minimum value is expressed as $$\Delta min=MIN(\Delta i,i+4) \tag{17}$$

Thereafter, the difference between the maximum value $\Delta max$ and the minimum value $\Delta min$ is calculated with the formula $$\Delta=\Delta max-\Delta min \tag{18}$$

In such cases, when the predetermined picture element P0 is located at the middle of the blood vessel pattern 1 and the conditions of Formulas (8) and (9) are satisfied, Formula (10) gives $$\Delta min=0 \tag{19}$$

Substitution of Formulas (11) and (19) into Formula (18) yields $$\Delta=\Delta max-\Delta min=2Q1-2Q0-0=2Q1-2Q0 \tag{20}$$

On the other hand, in cases where the predetermined picture element P0 is located at the middle of the tumor pattern 4 and the conditions of Formula (12) are satisfied, Formula (13) gives $$\Delta min=2Q1-2Q0 \tag{21}$$

Substitution of Formulas (14) and (21) into Formula (18) yields $$\Delta=\Delta max-\Delta min=(2Q1-2Q0)-(2Q1-2Q0)=0 \tag{22}$$

Specifically, different output values are obtained for the blood vessel pattern 1 in accordance with Formula (20) and for the tumor pattern 4 in accordance with Formula (22). Therefore, only the blood vessel pattern 1 extending in the X-ray image can be found, and no tumor pattern 4 is found by mistake as a blood vessel pattern.

In the manner described above, the blood vessel pattern in the X-ray image is found by the computer system 40 shown in FIG. 5. Thereafter, a visible X-ray image in which the blood vessel pattern has been emphasized is reproduced and displayed on the CRT display device 44 and utilized during a diagnosis.

In the aforesaid embodiments of the pattern finding apparatus in accordance with the present invention, the operations are carried out with the mean-level value Q0 of the values of image signal components corresponding to the center region Q0 and the mean-level values Qi, each of which represents the mean level of the values of image signal components corresponding to each of the peripheral regions Qi. The area of the center region Q0 and the areas of the peripheral regions Qi are selected in accordance with the level of noise superposed on the X-ray image, or the like. Therefore, in cases where, for example, the level of noise superposed on the X-ray image is low or noise removal processing is carried out, instead of the mean-level value Q0 and the mean-level values Qi being utilized, operations may be carried out with the value of the image signal component representing the predetermined picture element P0 and the values of the image signal components representing the picture elements Pi.

Also, in the aforesaid embodiments of the pattern finding apparatus in accordance with the present invention, as shown in FIG. 1, the length of the predetermined distance r is fixed. In an X-ray image, blood vessel patterns having various different widths may appear. In cases where only the blood vessel pattern having a specific width is to be found, the length of the predetermined distance r may be fixed. Alternatively, the length of the predetermined distance r may be varied among a plurality of predetermined distances r. The operations for finding a blood vessel pattern with respect to a predetermined distance r may then be carried out for each of the plurality of the predetermined distances r, and a plurality of output values may thus be obtained. The maximum value of the output values, which have thus been obtained for the plurality of the predetermined distances r, may be taken as a new output value. In such cases, blood vessel patterns having various different widths can be found.

In the aforesaid embodiments of the pattern finding apparatus in accordance with the present invention, the blood vessel pattern is found by processing the image signal representing the X-ray image with a blood vessel pattern finding filter. However, in the pattern finding apparatus in accordance with the present invention, the image signal representing the X-ray image need not necessarily be processed with the filter described above. For example, the X-ray image from which a blood vessel pattern is to be found may be displayed on the CRT display device 44. An operator may then designate a predetermined point (i.e. a predetermined picture element P0) in the displayed X-ray image. Thereafter, a judgment may be made as to whether the predetermined point falls or does not fall within the region corresponding to a blood vessel pattern. Also, the pattern, which is to be found with the pattern finding apparatus in accordance with the present invention, is not limited to the blood vessel pattern. For example, any of patterns primarily extending linearly, such as a rib pattern, in a radiation image may be found with the pattern finding apparatus in accordance with the present invention. Further, in the aforesaid embodiments of the pattern finding apparatus in accordance with the present invention, an X-ray image of the chest of a human body is stored on a stimulable phosphor sheet. However, the pattern finding apparatus in accordance with the present invention is not limited to the processing of X-ray images of chests. Also, recording media other than stimulable phosphor sheets may be used.

Embodiments of the linear pattern width calculating apparatus in accordance with the present invention will be described hereinbelow. In the embodiments, an X-ray image is stored on a stimulable phosphor sheet, and a pattern of a tumor, which typically has an approximately spherical shape in the lungs of a human body, is found from the X-ray image. Also, a blood vessel pattern is found, and its width is calculated.

In the X-ray image recording apparatus shown in FIG. 4, an X-ray image of the chest 13a of a human body is stored on the stimulable phosphor sheet 14 in the same manner as that described above. Thereafter, the X-ray image is read out from the stimulable phosphor sheet 14 in the X-ray image read-out apparatus shown in FIG. 5. The image signal SD, which has been obtained from the A/D converter 33 shown in FIG. 5, is fed into the computer system 40 shown in FIG. 5. In these embodiments, the computer system 40 constitutes an example of the linear pattern width calculating apparatus in accordance with the present invention.

On the basis of the image signal SD fed into the computer system 40, the tumor pattern and the blood vessel pattern are detected from the X-ray image. Also, the width of the blood vessel pattern is calculated.

In these embodiments, the combinations of the hardware functions and the software functions of the computer system 40 constitute examples of the respective means of the linear pattern width calculating apparatus in accordance with the present invention.

In the computer system 40, the image signal SD representing the X-ray image is processed with a tumor pattern finding filter, and the tumor pattern appearing in the X-ray image is found.

Figure 7:
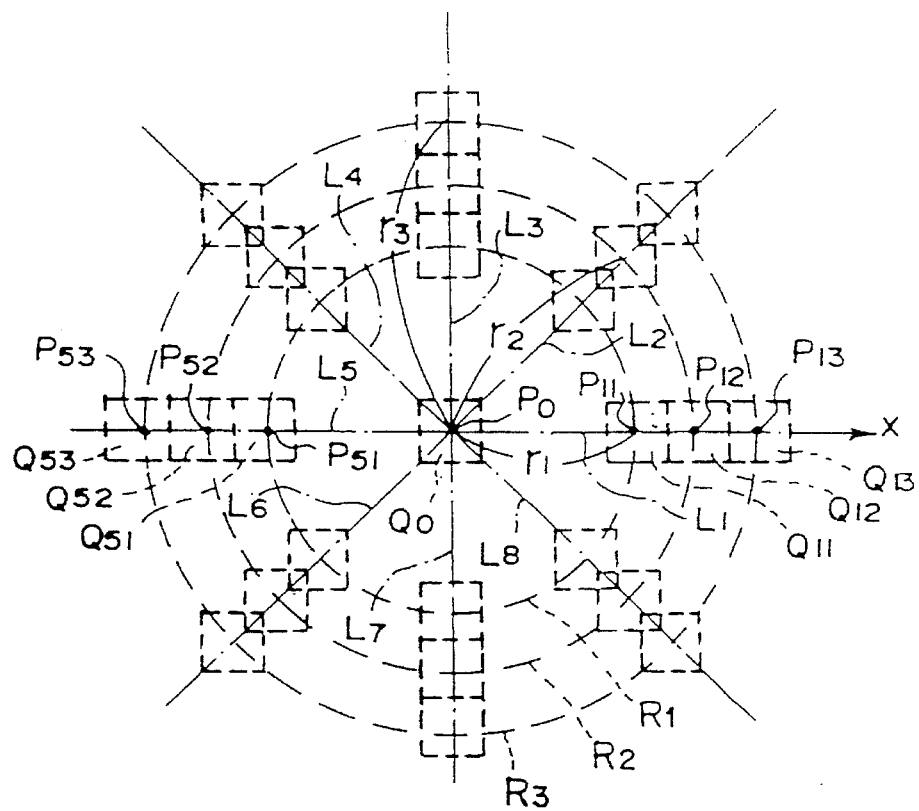
FIG. 7 is a diagram having a predetermined picture element P0 from an X-ray image in the middle, which diagram serves as an aid in explaining how a spatial-domain filter works during the operations for finding a tumor pattern.

FIG. 7 is a diagram having a predetermined picture element P0 from an X-ray image in the middle, which diagram serves as an aid in explaining how a spatial-domain filter works during the operations for finding a tumor pattern.

A judgment is made as to whether a predetermined picture element P0 in the X-ray image falls or does not fall within the region corresponding to the tumor pattern in the X-ray image. The tumor pattern, which may appear in the X-ray image, can be detected by processing the image signal components representing the picture elements of the X-ray image with the filter illustrated in FIG. 7. The filter described first below is disclosed in U.S. Pat. No. 5,033,100.

Figure 8:
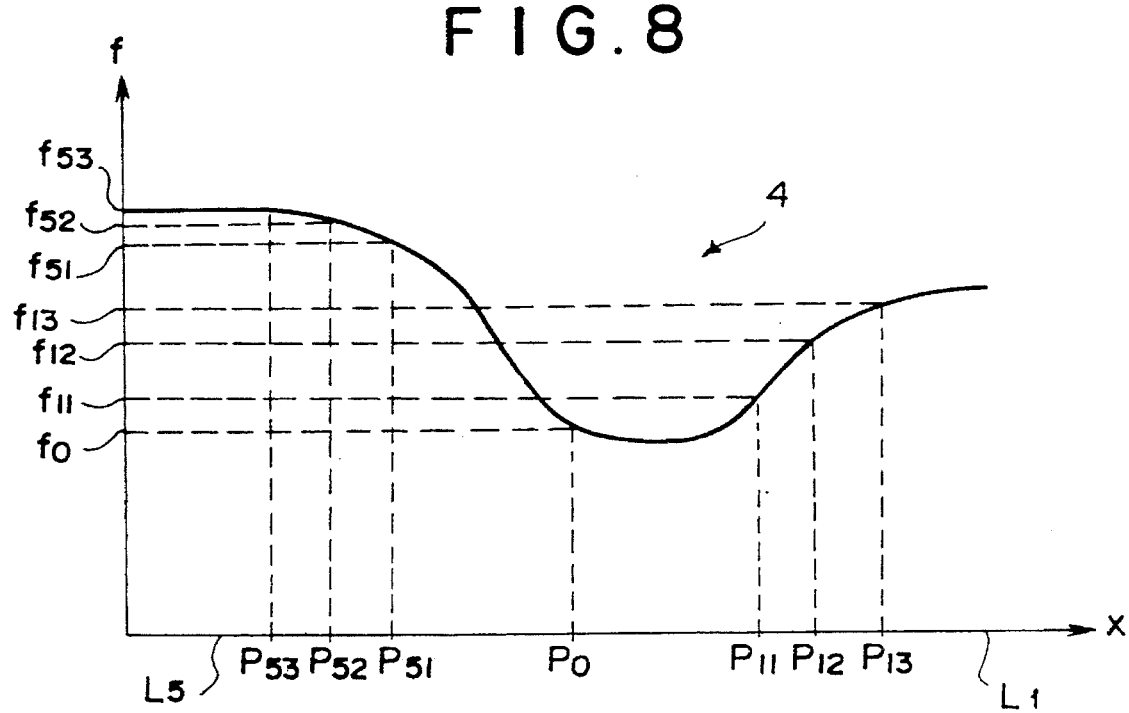
FIG. 8 is a graph showing an example of the profile of an X-ray image around a predetermined picture element P0 in the direction (x direction) along which the lines L1 and L5 shown in FIG. 7 extend.

FIG. 8 is a graph showing an example of the profile of an X-ray image around a predetermined picture element P0 in the direction (x direction) along which the lines L1 and L5 shown in FIG. 7 extend.

As shown in FIG. 7, a plurality of (in this case, eight) imaginary lines Li, where i=1, 2, . . . , 8, extend from the predetermined picture element P0 in the X-ray image to peripheral parts of the X-ray image. Also, imaginary circles Rj, where j=1, 2, 3, having radii r1, r2, and r3 extend around the predetermined picture element P0. The image signal component f0 representing the predetermined picture element P0 is found. Also, the image signal components fij, where i=1, 2, . . . , 8 and j=1, 2, 3, are found which represent the picture elements Pij located at the intersections of each of the lines Li and the circles Rj. (In FIG. 7, P11, P12, and P13 denote picture elements located at the intersections of a line L1 and circles R1, R2, and R3. Also, P51, P52, and P53 denote the picture elements located at the intersections of a line L5 and the circles R1, R2, and R3.)

Thereafter, differences Δij between the value of the image signal component f0 representing the predetermined picture element P0 and the values of the image signal components fij representing the picture elements Pij are calculated from Formula (23), which is expressed as $$\Delta ij = fij - f0 \quad (23)$$

(i=1,2, . . . , 8; j=1,2,3)

For each of the lines Li, the maximum value of the differences Δij, which have been calculated from Formula (23), is then found. Specifically, for the line L1, the maximum value of the differences between the value of the image signal component f0 representing the predetermined picture element P0 and the values of the image signal components f11, f12, and f13 representing the picture elements P11, P12, and P13 is found. The differences can be expressed as $$\Delta 11 = f11 - f0$$

$$\Delta 12 = f12 - f0$$

$$\Delta 12 = f13 - f0$$

In this example, as illustrated in FIG. 8, Δ13>Δ12>Δ11, and therefore the difference Δ13 is found to be the maximum value.

For the line L5, the maximum value of the differences between the value of the image signal component f0 representing the predetermined picture element P0 and the values of the image signal components f51, f52, and f53 representing the picture elements P51, P52, and P53 is also found. The differences are expressed as $$\Delta 51 = f51 - f0$$

$$\Delta 52 = f52 - f0$$

$$\Delta 53 = f53 - f0$$

In this example, the difference Δ53 is found to be the maximum value and is employed as the representative value, which is representative of the differences Δ51, Δ52, and Δ53, for the line L5.

In the manner described above, for each of the lines Li, the differences Δij between the value of the image signal component f0 representing the predetermined picture element P0 and the values of the image signal components fij representing the picture elements Pij are calculated, and the maximum value of the differences is found. The maximum value thus found is taken as the representative value with respect to the corresponding line.

Thereafter, calculations are made to find the mean-level value, for example, the mean value, of two representative values, which have been found for each set of two lines extending from the predetermined picture element P0 in opposite directions. Specifically, mean values M15, M26, M37, and M48 are calculated respectively for the set of lines L1 and L5, the set of lines L2 and L6, the set of lines L3 and L7, and the set of lines L4 and L8. For the set of lines L1 and L5, the mean value M15 is given by the formula $$M15 = \frac{\Delta 13 + \Delta 53}{2} \quad (24)$$

As described above, two lines extending from the predetermined picture element P0 in opposite directions are grouped into a single set. Therefore, a tumor pattern can be detected accurately even when it is present in a region, in which the image density changes sharply, and the distribution of the values of the image signal components representing the tumor pattern is asymmetric.

From the mean values M15, M26, M37, and M48, which have been calculated in the manner described above, a judgment is made as to whether the predetermined picture element P0 falls or does not fall within the region corresponding to the tumor pattern. In the linear pattern width calculating apparatus in accordance with the present invention, no limitation is imposed on how the judgment is made from the mean values M15, M26, M37, and M48. By way of example, the judgment may be made in the manner described below.

Figure 9:
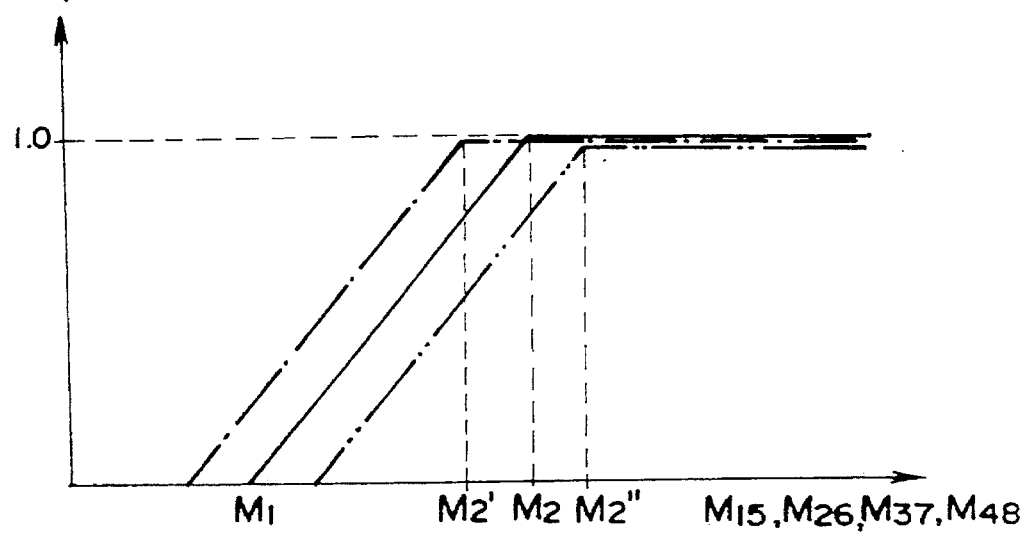
FIG. 9 is a graph showing an example of how a characteristic value is determined which is used during a judgment as to whether a predetermined picture element P0 falls or does not fall within the region corresponding to a tumor pattern.

FIG. 9 is a graph showing an example of how a characteristic value C1 is determined which is used during the judgment as to whether the predetermined picture element P0 falls or does not fall within the region corresponding to the tumor pattern. In FIG. 9, the horizontal axis represents the mean values M15, M26, M37, and M48, which have been calculated in the manner described above. The vertical axis represents rating values C15, C26, C37, and C48, which correspond respectively to the mean values M15, M26, M37, and M48.

A rating value of zero is assigned to the mean values M15, M26, M37, and M48 in cases where they are smaller than a certain value M1. A rating value of 1.0 is assigned to the mean values M15, M26, M37, and M48 in cases where they are larger than a certain value M2. In cases where the mean values M15, M26, M37, and M48 fall within the range of M1 to M2, a rating value falling within the range of 0.0 to 1.0 is assigned to the mean values M15, M26, M37, and M48, depending upon their values. In this manner, the rating values C15, C26, C37, and C48 are found, which correspond respectively to the mean values M15, M26, M37, and M48. The sum of the rating values C15, C26, C37, and C48, which is expressed as $$C1=C15+C26+C37+C48 \quad (25)$$

is taken as the characteristic value C1. The characteristic value C1 will fall within the range of a minimum value 0.0 to a maximum value 4.0.

The characteristic value C1 is then compared with a predetermined threshold value Th2. From whether C1≧Th2 or C1<Th2, the judgment is made as to whether the predetermined picture element P0 falls or does not fall within the region corresponding to the tumor pattern.

In cases where the rating values C15, C26, C37, and C48 are calculated from an equation such as the one represented by the single-dot chained line in FIG. 9, wherein saturation is reached at a small mean value, e.g. M2', the characteristic value C1 calculated from Formula (25) will take a larger value in cases where the shape of the tumor pattern is closer to a circle. In cases where the rating values C15, C26, C37, and C48 are calculated from an equation such as the one represented by the double-dot chained line in FIG. 9, wherein saturation is reached at a large mean value, e.g. M2'', the characteristic value C1 calculated from Formula (25) will take a larger value in cases where the contrast of the tumor pattern with respect to the surrounding image regions is higher. Therefore, an appropriate equation for transforming the mean values into the rating values can be selected in accordance with the characteristics of the tumor pattern which is to be found.

The process of making the judgment from the mean values M15, M26, M37, and M48 is not limited to using the characteristic value C1 and may be carried out in various other manners. For example, the mean values M15, M26, M37, and M48 may be compared with a threshold value Th3. In cases where all of the mean values M15, M26, M37, and M48 are larger than the threshold value Th3, it may be judged that the predetermined picture element P0 falls within the region corresponding to the tumor pattern. Alternatively, in cases where at least three of the mean values M15, M26, M37, and M48 are larger than the threshold value Th3, it may be judged that the predetermined picture element P0 falls within the region corresponding to the tumor pattern. As another alternative, the sum, M=M15+M26+M37+M48, of the mean values M15, M26, M37, and M48 may be calculated and compared with a threshold value Th4. In cases where M≧Th4, it may be judged that the predetermined picture element P0 falls within the region corresponding to the tumor pattern.

The algorithms employed in the filter for finding a tumor pattern are not limited to those described above. A filter utilizing different algorithms will be described hereinbelow. (Such a filter is proposed in U.S. Pat. No. 5,033,100.)

Specifically, calculations are made to find the gradients $\nabla fij$ of the image signal components fij representing the picture elements Pij, where i=1, 2, ..., 8 and j=1, 2, 3, which are shown in FIG. 7.

Figure 10:
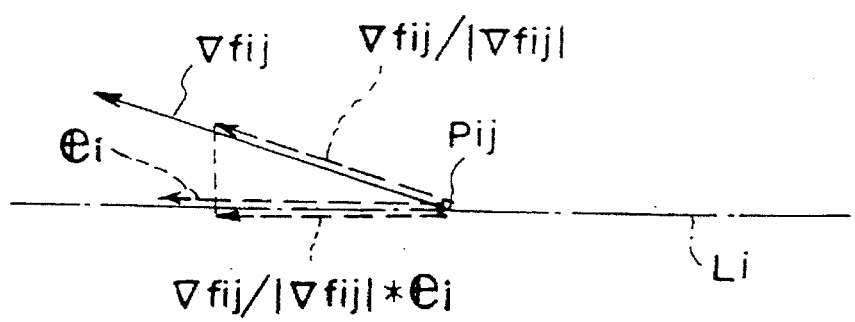
FIG. 10 is an explanatory view showing the vector of a gradient $\nabla fij$ of an image signal component fij.

FIG. 10 shows the gradient of an image signal component fij. How it is calculated is described below.

After the gradients $\nabla fij$ have been calculated, the magnitudes of the gradients $\nabla fij$ are made equal to 1.0. Specifically, the normalized gradients $\nabla fij/|\nabla fij|$ can be calculated by dividing the gradients $\nabla fij$ by their magnitudes $|\nabla fij|$.

Thereafter, the projections of the normalized gradients $\nabla fij/|\nabla fij|$ onto the vectors directed from the picture elements Pij to the predetermined picture element P0 are calculated. The projections are expressed as $\nabla fij/|\nabla fij|*ei$, where ei denotes the unit vectors directed from the picture elements Pij to the predetermined picture element P0, and * denotes the inner product.

As for the sign of the projections, the direction heading towards the predetermined picture element P0 is taken as positive, and the direction heading away from the predetermined picture element P0 is taken as negative. For each of the lines Li, where i=1, 2, ..., 8, the maximum value of the projections is found. The maximum value is expressed as $$\{\nabla fij/|\nabla fij|*ei\}m \ (i=1,2,\ldots,8)$$

Thereafter, the sum of the maximum values which were found for each of the respective lines Li is calculated. This sum is expressed as $$\sum_{i=1}^{8} \{\nabla fij/|\nabla fij|*ei\}m$$

The mean value of the maximum values can be obtained by dividing the sum by the number of lines Li (eight in this example). The sum is equal to the product of the mean value and a fixed number and can, therefore, be regarded as being equivalent to the mean value.

The sum expressed as $$\sum_{i=1}^{8} \{\nabla fij/|\nabla fij|*ei\}m$$

is taken as a characteristic value C2. The characteristic value C2 is then compared with a predetermined threshold value Th5. From whether C2≦Th5 or C2<Th5, a judgment is made as to whether the predetermined picture element P0 falls or does not fall within the region corresponding to the tumor pattern.

With the filter described above, the gradients ∇fij are normalized, and only the projections thereof (i.e. the extent of differences in the value of the signal components in the directions of the lines Li) onto vectors directed from the picture elements Pij to the predetermined picture element P0 are taken into consideration. Therefore, a characteristic value C2 is obtained, which will be large for a tumor pattern having a circular shape and which does not depend on the contrast of the tumor pattern with respect to the image regions around the tumor pattern. Accordingly, the tumor pattern can be detected accurately.

In the aforesaid embodiments of the linear pattern width calculating apparatus in accordance with the present invention, as shown in FIG. 7, the image signal components fij representing the picture elements Pij located on eight lines, L1 through L8, are employed. However, the number of lines Li is not limited to eight, but may, for example, be 16. Also, the distances from the predetermined picture element P0 are not limited to the three distances (r1, r2, and r3). In cases where the sizes of the tumor patterns, which are to be detected, are approximately the same, only a single distance need be employed. (In such cases, the operations for finding the representative values are unnecessary.) Also, in order for tumor patterns having various sizes to be detected more accurately, operations may be carried out for a plurality of distances whose lengths vary approximately continuously between the length of the distance r1 and the length of the distance r3.

A filter utilizing different algorithms will be described hereinbelow. (Such a filter is proposed in U.S. Pat. No. 5,033,100.)

FIG. 1 is a diagram having a predetermined picture element P0 from an X-ray image in the middle, which diagram serves as an aid in explaining how the algorithms work.

As shown in FIG. 1, a plurality of (in this case, eight) imaginary lines Li, where i=1, 2, ... , 8, extend from the predetermined picture element P0 in the X-ray image to the peripheral parts of the X-ray image. Also, an imaginary circle R having a radius r extends around the predetermined picture element P0. Thereafter, the area of a center region Q0 which includes the predetermined picture element P0 is selected. Also, the areas of peripheral regions Qi are selected which peripheral regions respectively include picture elements Pi (i=1, 2, ... , 8) located at the intersections of the lines Li (i=1, 2, ... , 8) and the circle R. The radius r, the area of the center region Q0, and the areas and number of the peripheral regions Qi are selected appropriately in accordance with the size of the tumor pattern which is to be detected, the level of accuracy required of the judgment, the speed with which the operations must be carried out, or the like. In this embodiment, picture elements Pi are employed which are located at equal distances r from the predetermined picture element P0. Alternatively, the distances of the picture elements Pi from the predetermined picture element P0 may vary. For example, in cases where a tumor pattern is to be detected which has a long axis extending along the X direction in FIG. 1, picture elements, which are more remote from the predetermined picture element P0 than the picture elements P1 and P5, may be employed in lieu of the picture elements P1 and P5.

Thereafter, a calculation is made to find a mean-level value Q0 of the values of image signal components representing a plurality of picture elements, which are located in the center region Q0. Also, calculations are made to find mean-level values Qi, where i=1, 2, ... , 8, each representing the mean level of the values of image signal components representing a plurality of picture elements located in each of the peripheral regions Qi. As an aid in facilitating the explanation, Q0 represents both the center region and the mean-level value of the values of image signal components representing the picture elements, which are located in the center region. Also, Qi, where i=1, 2, ... , 8, represents both the peripheral regions and the mean-level values representing the mean level of the values of the image signal components representing the picture elements, which are located in each of the peripheral regions.

Thereafter, differences Δi, where i=1, 2, ... , 8, between the mean-level value Q0 corresponding to the center region and the respective mean-level values Qi corresponding to the peripheral regions are calculated from the formula $$\Delta i = Qi - Q0$$

The mean value of the differences Δi, where i=1, 2, ... , 8, is then calculated from the formula $$\overline{\Delta} = \frac{1}{8} \sum_{i=1}^{8} \Delta i$$

Also, the variance of the differences Δi is calculated with the formula $$\sigma^2 = \frac{1}{8} \sum_{i=1}^{8} (\Delta i - \overline{\Delta})^2$$

The ratio C3 of the mean value $\overline{\Delta}$ to the variance $\sigma^2$ is then calculated with the formula $$C3 = \frac{\overline{\Delta}}{\sigma^2} \tag{26}$$

Thereafter, the ratio C3 is compared with a predetermined threshold value Th6. In cases where C3≦Th6, because the mean value $\overline{\Delta}$ is comparatively large and the variance $\sigma^2$ is comparatively small, it is judged that the predetermined picture element P0 falls within the region corresponding to the tumor pattern. In cases where C3<Th6, it is judged that the predetermined picture element P0 is located in the area outside of the tumor pattern.

A further example of the spatial-domain filter will be described hereinbelow with reference to FIG. 7.

As shown in FIG. 7, a plurality of (in this case, eight) imaginary lines Li, where i=1, 2, ... , 8, extend from the predetermined picture element P0 in the X-ray image to the peripheral parts of the X-ray image. Also, three imaginary circles Rj, where j=1, 2, 3, which have radii r1, r2, and r3, extend around the predetermined picture element P0. Thereafter, the area of a center region Q0 including the predetermined picture element P0 is selected. Also, the areas of peripheral regions Qij, where i=1, 2, ..., 8 and j=1, 2, 3, are selected for each of the lines Li. Each of the peripheral regions Qij includes one of a plurality of picture elements Pij, which are located at the intersections of each of the lines Li and the circles Rj. (In FIG. 7, P11, P12, and P13 denote the picture elements located at the intersections of a line L1 and circles R1, R2, and R3. Also, P51, P52, and P53 denote the picture elements located at the intersections of a line L5 and the circles R1, R2, and R3. Further, Q11, Q12, Q13, Q51, Q52, and Q53 denote the peripheral regions which respectively include the picture elements P11, P12, P13, P51, P52, and P53.)

Thereafter, a calculation is made to find a mean-level value Q0 of the values of X-ray image signal components representing a plurality of picture elements, which are located in the center region Q0. Also, calculations are made to find mean-level values Qij, where i=1, 2, ..., 8 and j=1, 2, 3, each representing the mean level of the values of X-ray image signal components representing a plurality of picture elements located in each of the peripheral regions Qij, where i=1, 2, ..., 8 and j=1, 2, 3. As an aid in facilitating the explanation, Q0 represents both the center region and the mean-level value of the values of image signal components representing the picture elements, which are located in the center region. Also, Qij, where i=1, 2, ..., 8 and j=1, 2, 3, represents both the peripheral regions and the mean-level values representing the mean level of the values of the image signal components representing the picture elements, which are located in each of the peripheral regions.

Thereafter, differences $\Delta ij$, where i=1, 2, ..., 8 and j=1, 2, 3, between the mean-level value Q0 corresponding to the center region and the respective mean-level values Qij corresponding to the peripheral regions are calculated from the formula $$\Delta ij = Qij - Q0 \quad (27)$$

For each of the lines Li, the maximum value $\Delta i$ of the differences $\Delta ij$ is then found.

A first characteristic value U is then found, which is representative of the maximum values $\Delta i$, where i=1, 2, ..., 8, which have been found for the plurality of the lines Li. Also, a second characteristic value V is found, which represents the amount of dispersion in the maximum values $\Delta i$, where i=1, 2, ..., 8. For this purpose, first, characteristic values U1, U2, U3, and U4, and characteristic values V1, V2, V3, and V4 are calculated from the formulas $$U1 = (\Delta 1 + \Delta 2 + \Delta 5 + \Delta 6)/4 \quad (28)$$

$$U2 = (\Delta 2 + \Delta 3 + \Delta 6 + \Delta 7)/4 \quad (29)$$

$$U3 = (\Delta 3 + \Delta 4 + \Delta 7 + \Delta 8)/4 \quad (30)$$

$$U4 = (\Delta 4 + \Delta 5 + \Delta 8 + \Delta 1)/4 \quad (31)$$

$$V1 = U1/U3 \quad (32)$$

$$V2 = U2/U4 \quad (33)$$

$$V3 = U3/U1 \quad (34)$$

$$V4 = U4/U2 \quad (35)$$

By way of example, the process for calculating the characteristic value U1 from Formula (28) has the effects described below. Specifically, the addition of the maximum values corresponding to two adjacent groups of peripheral regions, which are located on the same side with respect to the predetermined picture element P0, (i.e. the addition of $\Delta 1$ and $\Delta 2$, or the addition of $\Delta 5$ and $\Delta 6$) corresponds to a smoothing process. Also, the maximum values corresponding to peripheral regions, which are located on opposite sides with respect to the predetermined picture element P0, are added together (in the case of Formula (28), the sum of $\Delta 1$ and $\Delta 2$ and the sum of $\Delta 5$ and $\Delta 6$ are added together). Such an addition is carried out in order that a tumor pattern can be detected even when it is present in a region where the image density changes sharply.

As for the calculation of the characteristic value V1 from Formula (32), the characteristic values U1 and U3 represent characteristics of the pattern in directions which are perpendicular to each other. Therefore, in cases where the shape of the tumor pattern 4 is circular in FIG. 8, V1 will be approximately equal to 1.0. In cases where the pattern is not circular, i.e. when the predetermined picture element P0 is present in the region corresponding to a linear pattern, V1 will not be equal to 1.0.

As the first characteristic value U, which is representative of the maximum values $\Delta i$, where i=1, 2, ..., 8, of the aforesaid differences, the maximum value of the characteristic values U1, U2, U3, and U4, i.e.

$$U = \mathrm{MAX}(U1, U2, U3, U4) \quad (36)$$

is employed. Also, as the second characteristic value V, which represents the amount of dispersion in the maximum values $\Delta i$, where i=1, 2, ..., 8, of the aforesaid differences, the maximum value of the characteristic values V1, V2, V3, and V4, i.e.

$$V = \mathrm{MAX}(V1, V2, V3, V4) \quad (37)$$

is employed. After the first characteristic value U and the second characteristic value V have been found in the manner described above, a characteristic value C4 is calculated and then used during the judgment as to whether a predetermined picture element P0 falls or does not fall within the region corresponding to the tumor pattern. As the characteristic value C4, the ratio of the first characteristic value U to the second characteristic value V is employed, which is expressed as $$C4 = \frac{U}{V} \quad (38)$$

The characteristic value C4 is then compared with a predetermined threshold value Th7. From whether $C4 \leq Th7$ or $C4 < Th7$, the judgment is made as to whether the predetermined picture element P0 falls or does not fall within the region corresponding to the tumor pattern.

In this example of the filter, as shown in FIG. 7, eight imaginary lines, L1 through L8, extend around a predetermined picture element P0 in an X-ray image. However, the number of lines Li is not limited to eight, but may, for example, be 16. This also applies to the embodiment of the linear pattern width calculating apparatus in accordance with the present invention, which has been described above with reference to FIG. 1. Also, in the embodiment of the linear pattern width calculating apparatus in accordance with the present invention, which has been described above with reference to FIG. 7, the distances from the predetermined picture element P0 are not limited to the three distances (r1, r2, and r3). For example, in order for tumor patterns having various sizes to be detected more accurately, operations may be carried out for a plurality of distances whose lengths vary approximately continuously between the length of the distance r1 and the length of the distance r3.

By processing the image signal representing the X-ray image with one of the spatial-domain filters described above, a combination of these spatial-domain filters, or one of the other known filters, tumor patterns which appear, typically, as circular patterns in the X-ray image can be detected. Thereafter, a judgment is made by a judgment means, which will be described later, as to whether a tumor pattern, which has been detected in the manner described above, is or is not a true tumor pattern. Therefore, a tumor pattern, which has been detected in the manner described above, is referred to as a prospective tumor pattern.

In the computer system 40, before or after the prospective tumor pattern is detected, the image signal SD representing the X-ray image is processed with a blood vessel pattern finding filter, and a blood vessel pattern appearing in the X-ray image is thereby found.

As an example of the blood vessel pattern finding filter, the filter may be employed, which has been described above with reference to FIGS. 1, 2, and 3 and which works with Formulas (1) and (2). However, as described above, with this blood vessel pattern finding filter, in cases where $\Delta max=\Delta 5$, the same output value is obtained for an image having a profile indicated by the solid line 2 in FIG. 2 and an image having a profile indicated by the broken line 3 in FIG. 2. Specifically, the same results of judgment are obtained when the predetermined picture element P0 is located in the region corresponding to the blood vessel pattern 1 and when the predetermined picture element P0 is located in the vicinity of a boundary line 3a. Even if the boundary line 3a is detected as a blood vessel pattern, it is eliminated when a judgment is made by a judgment means, which will be described later, as to whether the detected pattern is or is not a true tumor pattern, and therefore no problem occurs.

As a different example of the blood vessel pattern finding filter, a filter with which the boundary line 3a is not detected by mistake as a blood vessel pattern may be employed. As such a blood vessel pattern finding filter, the filter may be employed, which has been described above with reference to FIGS. 1, 2, and 3 and which works with Formulas (3) through (7). However, as described above, with this blood vessel pattern finding filter, the same output value is also obtained for an approximately circular pattern, such as a tumor pattern 4, the diameter of which is approximately equal to the width of the blood vessel pattern 1 shown in FIG. 3. Therefore, not only a blood vessel pattern extending in an X-ray image is found, but an approximately circular pattern is also detected as a blood vessel pattern. Specifically, with this filter, as described above with reference to Formulas (8) through (14), the blood vessel pattern 1 and the tumor pattern 4 shown in FIG. 3 cannot be discriminated from each other. Therefore, with this blood vessel pattern finding filter, a tumor pattern having approximately the same diameter as the thickness of a blood vessel pattern is also detected as a blood vessel pattern.

In the computer system 40, the prospective tumor pattern and the blood vessel pattern are found in the manner described above. Thereafter, with respect to the region in the X-ray image in which both prospective tumor pattern and the blood vessel pattern have been found, a judgment is made as to whether the found pattern is a tumor pattern or a blood vessel pattern.

Figure 6:
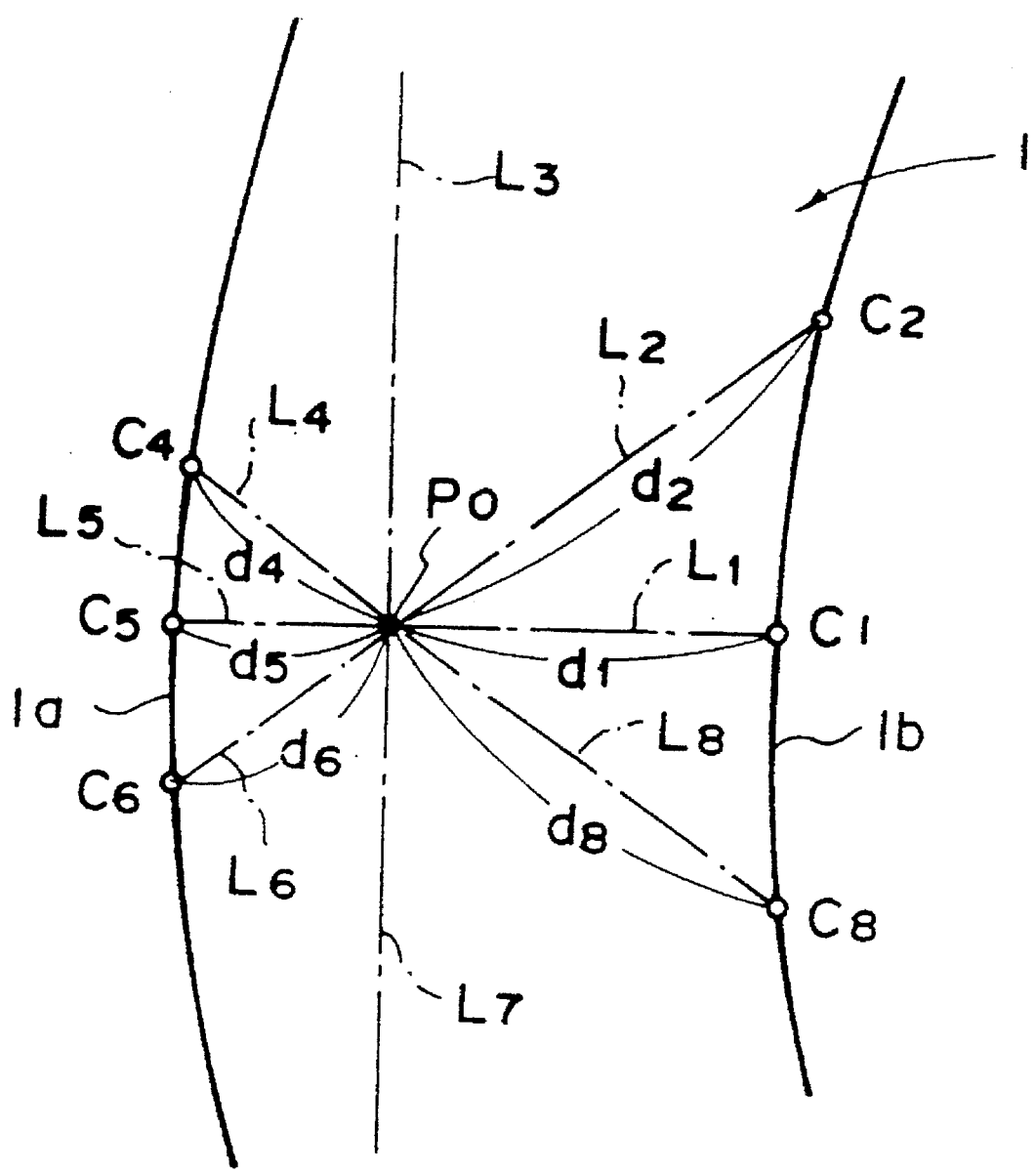
FIG. 6 is a diagram showing a blood vessel pattern and lines drawn on the blood vessel pattern, which diagram serves as an aid in explaining how the thickness (i.e. the width) of a blood vessel pattern is calculated.

FIG. 6 is a diagram showing a blood vessel pattern and lines drawn on the blood vessel pattern, which diagram serves as an aid in explaining how the thickness (i.e. the width) of a blood vessel pattern is calculated. The width of the blood vessel pattern is utilized during the judgment as to whether the found pattern is a tumor pattern or a blood vessel pattern. The width of the blood vessel pattern 1 is taken at the position at which a predetermined picture element P0 falling within the region corresponding to the blood vessel pattern 1 is located. The width of the blood vessel pattern 1 is calculated in the manner described below.

With reference to FIG. 6, operations are carried out in order to find an intersection of each of a plurality of lines L1, L2, ..., L8 and either one of boundary lines 1a, 1b of the blood vessel pattern 1. The plurality of lines L1, L2, ..., L8 extend from the predetermined picture element P0 toward edges of the X-ray image such that two lines (in the example of FIG. 6, lines L1 and L5, lines L2 and L6, lines L3 and L7, or lines L4 and L8) extending from the predetermined picture element P0 in opposite directions may be grouped into a single set and a plurality of sets of lines (in this example, four sets of lines) may thus be obtained. In this manner, intersections C1, C2, ..., C8 are found.

Thereafter, the distances d1, d2, ..., d8 between the predetermined picture element P0 and the intersections C1, C2, ..., C8 are calculated. Two distances, which have been calculated for each set of the two lines, are then added, and the distance between the two intersections for each set of the two lines is thereby calculated. The additions are expressed as d1+d5, d2+d6, d3+d7, and d4+d8. After the distances d1+d5, d2+d6, d3+d7, and d4+d8, each of which has been calculated between the two intersections for each set of the two lines, are calculated, the minimum distance, i.e. the distance d1+d5 in this example, is found from the distances d1+d5, d2+d6, d3+d7, and d4+d8. The minimum distance d1+d5 is determined as the width (or the thickness) of the linear pattern, which width is taken at the position at which the predetermined picture element P0 is located.

In FIG. 6, eight lines are shown. However, the number of lines is not limited to eight, and may be 16, 32, or the like.

Figure 11A:
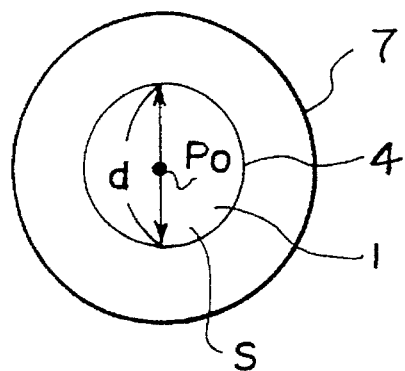
FIGS. 11A, 11B, and 11C are diagrams each showing a pattern of an X-ray image in an enlarged prospective tumor pattern region in an area, in which area both a prospective tumor pattern and a blood vessel pattern have been found, the enlarged prospective tumor pattern region including the prospective tumor pattern and extending to parts in the vicinity of the prospective tumor pattern.
Figure 11B:
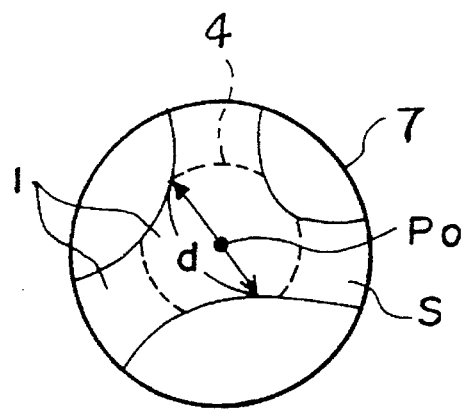
Figure 11C:
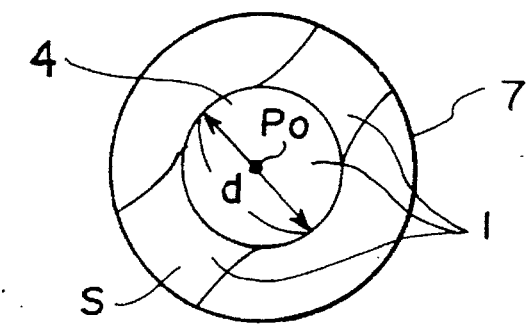

FIGS. 11A, 11B, and 11C are diagrams each showing a pattern of an X-ray image in an enlarged prospective tumor pattern region in an area, in which area both a prospective tumor pattern and a blood vessel pattern have been found, the enlarged prospective tumor pattern region including the prospective tumor pattern and extending to parts in the vicinity of the prospective tumor pattern. FIGS. 11A, 11B, and 11C respectively show a tumor pattern, a pattern of a branch point of a blood vessel, and a pattern of a blood vessel, which extends in the direction normal to the plane of the X-ray image, i.e. in the direction along which the X-rays were irradiated during the recording of the X-ray image.

The pattern of a branch point of a blood vessel shown in FIG. 11B and the pattern of a blood vessel shown in FIG. 11C, which extends in the direction normal to the plane of the X-ray image, have approximately circular shapes. Therefore, when the image signal representing the X-ray image is processed with a tumor pattern finding filter, it often occurs that the pattern of a branch point of a blood vessel shown in FIG. 11B and the pattern of a blood vessel shown in FIG. 11C, which extends in the direction normal to the plane of the X-ray image, are also found as a tumor pattern.

Also, when the image signal representing the X-ray image is processed with a blood vessel pattern finding filter, the tumor pattern shown in FIG. 11A, the diameter of which is approximately equal to the thickness of a blood vessel pattern, is found as a blood vessel pattern.

Therefore, an enlarged prospective tumor pattern region 7 is selected in an area, in which area both a prospective tumor pattern 4 and a blood vessel pattern 1 have been found, the enlarged prospective tumor pattern region 7 including the prospective tumor pattern 4 and extending to parts in the vicinity of the prospective tumor pattern 4. The area of the blood vessel pattern 1 falling within the enlarged prospective tumor pattern region 7 is represented by S. The picture elements located in the blood vessel pattern 1 falling within the enlarged prospective tumor pattern region 7 are sequentially taken as a predetermined picture element P0. At the position at which each predetermined picture element P0 is located, the thickness (or the width) of the blood vessel pattern 1 is calculated with the aforesaid algorithms for calculating the thickness of the blood vessel pattern. Thereafter, the maximum width d is found from the widths, which have thus been calculated. As described above, the tumor pattern shown in FIG. 11A has also been found as a blood vessel pattern. Therefore, during the operations utilizing the algorithms for calculating the width (or the thickness) of the blood vessel pattern, the diameter of the tumor pattern is also found as the thickness of the blood vessel pattern.

In the manner described above, the area S and the maximum width d of the blood vessel pattern 1 falling within the enlarged prospective tumor pattern region 7 are calculated. Thereafter, from the area S and the maximum width d, a judgment is made as to whether the prospective tumor pattern is or is not a true tumor pattern. No limitation is imposed on which operation formula is to be employed during the judgment. By way of example, the value E1 may be calculated which is expressed as $$E1 = \frac{S}{d^2} \quad (39)$$

The value E1 is then compared with a predetermined threshold value Th8. When the condition of $$E1 \leq Th8 \quad (40)$$

is satisfied, it is judged that the prospective tumor pattern is a true tumor pattern. When the condition of $$E1 > Th8 \quad (41)$$

is satisfied, it is judged that the prospective tumor pattern is not a true tumor pattern, but is a pattern of a branch point of a blood vessel or a pattern of a blood vessel, which extends in the direction normal to the plane of the X-ray image.

Alternatively, the judgment may be made with the operation formula $$E2 = S/d \quad (42)$$

In the computer system 40 shown in FIG. 5, a judgment is made in the manner described above as to whether a tumor pattern, which has been found, is or is not a true tumor pattern.

After a judgment is made in the manner described above, a visible image is reproduced and displayed on the CRT display device 44, or the like, such that the the image region, which has been judged as corresponding to a true tumor pattern, can be viewed clearly. Such a visible image can serve as an effective tool in the efficient and accurate diagnosis of an illness.

In the aforesaid embodiments of the linear pattern width calculating apparatus in accordance with the present invention, the blood vessel pattern is found when the tumor pattern is to be detected which may appear typically as a circular pattern in the X-ray image of the chest of a human body stored on a stimulable phosphor sheet. The width of the blood vessel pattern is then calculated. The linear pattern width calculating apparatus in accordance with the present invention is also applicable when the width of a blood vessel pattern is calculated for purposes other than the detection of a tumor pattern. Also, in the aforesaid embodiments of the linear pattern width calculating apparatus in accordance with the present invention, the blood vessel pattern is found automatically. However, in the linear pattern width calculating apparatus in accordance with the present invention, operations for finding a blood vessel pattern, or the like, need not necessarily be carried out automatically. By way of example, an X-ray image may be displayed on the CRT display device 44 shown in FIG. 5, and an operator may designate a predetermined picture element P0 in the region corresponding to a blood vessel pattern. The calculation may then be made in order to find the width of the blood vessel pattern, which width is taken at the position at which the predetermined picture element P0 is located. Further, the linear pattern width calculating apparatus in accordance with the present invention is not limited to the calculation of the width of a blood vessel pattern, and is also applicable when the width of a rib pattern, or the like, is calculated. The linear pattern width calculating apparatus in accordance with the present invention is applicable widely when widths of linear patterns appearing in radiation images are calculated.

Embodiments of the first abnormal pattern detecting apparatus in accordance with the present invention will be described hereinbelow. In these embodiments, an X-ray image is stored on a stimulable phosphor sheet, and a pattern of a tumor, which typically has an approximately spherical shape in the lungs of a human body, is detected as an abnormal pattern from the X-ray image. In a visible image reproduced from an image signal representing the X-ray image, the tumor pattern typically appears as an approximately circular pattern having a lower density than the areas of the image surrounding the tumor pattern.

In the X-ray image recording apparatus shown in FIG. 4, an X-ray image of the chest 13a of a human body is stored on the stimulable phosphor sheet 14 in the same manner as that described above. Thereafter, the X-ray image is read out from the stimulable phosphor sheet 14 in the X-ray image read-out apparatus shown in FIG. 5. The image signal SD, which has been obtained from the A/D converter 33 shown in FIG. 5, is fed into the computer system 40 shown in FIG. 5. In these embodiments, the computer system 40 constitutes an example of the first abnormal pattern detecting apparatus in accordance with the present invention.

On the basis of the image signal SD fed into the computer system 40, an abnormal pattern is detected from the X-ray image.

In these embodiments, the combinations of the hardware functions and the software functions of the computer system 40 constitute examples of the respective means of the first abnormal pattern detecting apparatus in accordance with the present invention.

First finding means (abnormal pattern finding means)

In an abnormal pattern finding means of the computer system 40, the image signal SD representing the X-ray image is processed with a tumor pattern finding filter, and the tumor pattern appearing in the X-ray image is found.

By way of example, in order to find a tumor pattern, the spatial-domain filter may be employed, which has been described above with reference to FIGS. 7, 8, and 9 and which works with Formulas (23), (24), and (25). Alternatively, the spatial-domain filter may be employed, which has been described above with reference to FIG. 10. As another alternative, the spatial-domain filter may be employed, which has been described above with reference to FIG. 1 and which works with Formula (26), or the like. As a further alternative, the spatial-domain filter may be employed, which has been described above with reference to FIGS. 7 and 8 and which works with Formulas (27) through (38).

By processing the image signal representing the X-ray image with one of the spatial-domain filters described above, a combination of these spatial-domain filters, or one of the other known filters, tumor patterns which appear, typically, as circular patterns in the X-ray image can be detected. Thereafter, a judgment is made by a judgment means, which will be described later, as to whether a tumor pattern, which has been detected in the manner described above, is or is not a true tumor pattern. Therefore, a tumor pattern, which has been detected in the manner described above, is referred to as a prospective tumor pattern.

Second finding means (blood vessel pattern finding means)

In a blood vessel pattern finding means of the computer system 40, before or after the prospective tumor pattern is detected, the image signal SD representing the X-ray image is processed with a blood vessel pattern finding filter, and a blood vessel pattern appearing in the X-ray image is thereby found.

As an example of the blood vessel pattern finding filter, the filter may be employed, which has been described above with reference to FIGS. 1, 2, and 3 and which works with Formulas (1) and (2). However, as described above, with this blood vessel pattern finding filter, in cases where $\Delta max=\Delta 5$, the same output value is obtained for an image having a profile indicated by the solid line 2 in FIG. 2 and an image having a profile indicated by the broken line 3 in FIG. 2. Specifically, the same results of judgment are obtained when the predetermined picture element P0 is located in the region corresponding to the blood vessel pattern 1 and when the predetermined picture element P0 is located in the vicinity of a boundary line 3a. Even if the boundary line 3a is detected as a blood vessel pattern, it is eliminated when a judgment is made by a judgment means, which will be described later, as to whether the detected pattern is or is not a true tumor pattern, and therefore no problem occurs.

As a different example of the blood vessel pattern finding filter, a filter with which the boundary line 3a is not detected by mistake as a blood vessel pattern may be employed. As such a blood vessel pattern finding filter, the filter may be employed, which has been described above with reference to FIGS. 1, 2, and 3 and which works with Formulas (3) through (7). However, as described above, with this blood vessel pattern finding filter, the same output value is also obtained for an approximately circular pattern, such as a tumor pattern 4, the diameter of which is approximately equal to the width of the blood vessel pattern 1 shown in FIG. 3. Therefore, not only a blood vessel pattern extending in an X-ray image is found, but an approximately circular pattern is also detected as a blood vessel pattern. Specifically, with this filter, as described above with reference to Formulas (8) through (14), the blood vessel pattern 1 and the tumor pattern 4 shown in FIG. 3 cannot be discriminated from each other. Therefore, with this blood vessel pattern finding filter, a tumor pattern having approximately the same diameter as the thickness of a blood vessel pattern is also detected as a blood vessel pattern.

Judgment means

The prospective tumor pattern and the blood vessel pattern are found in the manner described above. Thereafter, in the judgment means of the computer system 40, with respect to the region in the X-ray image in which both prospective tumor pattern and the blood vessel pattern have been found, a judgment is made as to whether the found pattern is a tumor pattern or a blood vessel pattern.

The judgment is made in the same manner as that described above with reference to FIG. 6 and FIGS. 11A, 11B, 11C and in accordance with Formulas (39) through (42).

As described above, an enlarged prospective tumor pattern region 7 is selected in an area, in which area both a prospective tumor pattern 4 and a blood vessel pattern 1 have been found, the enlarged prospective tumor pattern region 7 including the prospective tumor pattern 4 and extending to parts in the vicinity of the prospective tumor pattern 4. The area of the blood vessel pattern 1 falling within the enlarged prospective tumor pattern region 7 is represented by S. The enlarged prospective tumor pattern region 7 includes the prospective tumor pattern 4 and parts surrounding the prospective tumor pattern 4. By way of example, in cases where a prospective tumor pattern has been found by comparing the output values, which were obtained with one of various filters described above, with a threshold value, the comparing operations may be repeated with a threshold value, which is smaller than said threshold value, and the region may thus be enlarged to parts surrounding the prospective tumor pattern. The region thus enlarged may be employed as the enlarged prospective tumor pattern region 7. Alternatively, a circular region, which extends to parts surrounding the prospective tumor pattern, may be selected in accordance with the area of the prospective tumor pattern. The circular region thus selected may be employed as the enlarged prospective tumor pattern region 4.

The judgment process need not be carried out for a prospective tumor pattern, which has a comparatively large area and therefore is clearly considered as not being a blood vessel pattern.

In the computer system 40 shown in FIG. 5, a judgment is made in the manner described above as to whether a tumor pattern, which has been found, is or is not a true tumor pattern.

After a judgment is made in the manner described above, a visible image is reproduced and displayed on the CRT display device 44, or the like, such that the the image region, which has been judged as corresponding to a true tumor pattern, can be viewed clearly. Such a visible image can serve as an effective tool in the efficient and accurate diagnosis of an illness.

In the aforesaid embodiments of the first abnormal pattern detecting apparatus in accordance with the present invention, the tumor pattern is detected, which may appear typically as a circular pattern in the X-ray image of the chest of a human body stored on a stimulable phosphor sheet. However, the first abnormal pattern detecting apparatus in accordance with the present invention is not limited to the processing of X-ray images of chests. Also, recording media other than stimulable phosphor sheets may be used. Further, in first abnormal pattern detecting apparatus in accordance with the present invention, the abnormal pattern to be detected is not limited to a tumor pattern but may be, for example, a pattern of a calcified part. The linear pattern is not limited to a blood vessel pattern but may be, for example, a rib pattern. The first abnormal pattern detecting apparatus in accordance with the present invention is applicable widely when, from image signals representing radiation images of objects, abnormal patterns in the radiation images are detected.

Embodiments of the second, third, and fourth abnormal pattern detecting apparatuses in accordance with the present invention will be described hereinbelow. In these embodiments, an X-ray image is stored on a stimulable phosphor sheet, and a pattern of a tumor, which typically has an approximately spherical shape in the lungs of a human body, is detected as an abnormal pattern from the X-ray image. In a visible image reproduced from an image signal representing the X-ray image, the tumor pattern typically appears as an approximately circular pattern having a lower density than the areas of the image surrounding the tumor pattern.

In the X-ray image recording apparatus shown in FIG. 4, an X-ray image of the chest 13a of a human body is stored on the stimulable phosphor sheet 14 in the same manner as that described above. Thereafter, the X-ray image is read out from the stimulable phosphor sheet 14 in the X-ray image read-out apparatus shown in FIG. 5. The image signal SD, which has been obtained from the A/D converter 33 shown in FIG. 5, is fed into the computer system 40 shown in FIG. 5. In each of these embodiments, the computer system 40 constitutes an example of the second, third, or fourth abnormal pattern detecting apparatus in accordance with the present invention.

On the basis of the image signal SD fed into the computer system 40, an abnormal pattern is detected from the X-ray image.

In these embodiments, the combinations of the hardware functions and the software functions of the computer system 40 constitute examples of the respective means of the second, third, and fourth abnormal pattern detecting apparatuses in accordance with the present invention.

How processing is carried out in the computer system 40 will be described below. How a tumor pattern emphasizing filter and a blood vessel pattern emphasizing filter work during the processing will then be described below.

FIGS. 12A, 12B, and 12C are block diagrams showing embodiments of the second, third, and fourth abnormal pattern detecting apparatuses in accordance with the present invention.

With reference to FIG. 12A, in a tumor pattern emphasizing means 51 of the computer system 40, the image signal SD, which represents the X-ray image and has been fed into the computer system 40, is processed with a tumor pattern finding filter, which will be described later. In this manner, a first tumor pattern emphasized image, in which a tumor pattern in the X-ray image has been emphasized, is formed. In the first tumor pattern emphasized image, a pattern of a branch point of a blood vessel and a pattern of a blood vessel, which extends in the direction normal to the plane of the X-ray image, have also been emphasized. Also, in a blood vessel pattern emphasizing means 52 of the computer system 40, the image signal SD is processed with a blood vessel pattern emphasizing filter, which will be described later. In this manner, a blood vessel pattern emphasized image, in which a blood vessel pattern in the X-ray image has been emphasized, is formed. Thereafter, in a difference calculating means 53, the emphasis of a pattern, which has been emphasized in both the first tumor pattern emphasized image and the blood vessel pattern emphasized image, is canceled from the first tumor pattern emphasized image. In this manner, a second tumor pattern emphasized image, in which only the true tumor pattern has been emphasized, is formed. Thereafter, a tumor pattern finding means 54 accurately finds only the true tumor pattern from the second tumor pattern emphasized image.

In an embodiment shown in FIG. 12B, the image signal SD, which has been fed into the computer system 40, is fed into a blood vessel pattern emphasizing means 55 and a difference calculating means 56. In the blood vessel pattern emphasizing means 55, a blood vessel pattern emphasized image, in which a blood vessel pattern in the X-ray image has been emphasized, is formed from the image signal SD. The image signal SD1 representing the blood vessel pattern emphasized image is also fed into the difference calculating means 56. The difference calculating means 56 subtracts the image signal SD1 representing the blood vessel pattern emphasized image from the image signal SD representing the original X-ray image and thereby generates an image signal SD2 representing a blood vessel pattern degenerated image, in which the blood vessel pattern has been eliminated from the original X-ray image. The image signal SD2 representing the blood vessel pattern degenerated image is fed into a tumor pattern emphasizing means 57. The tumor pattern emphasizing means 57 processes the image signal SD2 in order to emphasize the tumor pattern. The image represented by the image signal SD2 is free of the blood vessel pattern. Therefore, when the process for emphasizing the tumor pattern is carried out in the tumor pattern emphasizing means 57, no blood vessel pattern is emphasized. Accordingly, in a tumor pattern finding means 58, only the true tumor pattern can be found accurately.

In an embodiment shown in FIG. 12C, the image signal SD, which has been fed into the computer system 40, is fed into a tumor pattern emphasizing means 59. The tumor pattern emphasizing means 59 generates an image signal SD3 representing a first tumor pattern emphasized image. The image signal SD3 is then fed into a blood vessel pattern emphasizing means 60 and a difference calculating means 61. The blood vessel pattern emphasizing means 60 carries out a blood vessel pattern emphasizing process on the image signal SD3 representing the first tumor pattern emphasized image. As a result, of the patterns which have been emphasized in the first tumor pattern emphasized image, the blood vessel pattern is emphasized with both the tumor pattern emphasizing filter and the blood vessel pattern emphasizing filter. In this manner, only the blood vessel pattern, which is among the patterns having been emphasized in the first tumor pattern emphasized image, can be shown clearly in the resulting blood vessel pattern emphasized image. The image signal SD4, which has been generated by the blood vessel pattern emphasizing means 60 and represents the blood vessel pattern emphasized image, is fed into a difference calculating means 61 together with the image signal SD3, which has been generated by the tumor pattern emphasizing means 59. The difference calculating means 61 subtracts the image signal SD4 representing the blood vessel pattern emphasized image from the image signal SD3 representing the first tumor pattern emphasized image and thereby generates an image signal representing a second tumor pattern emphasized image. Thereafter, in a tumor pattern finding means 62, the tumor pattern is accurately found from the second tumor pattern emphasized image.

With one of the embodiments shown in FIGS. 12A, 12B, and 12C, the tumor pattern is separated from the blood vessel pattern, and the true tumor pattern is found accurately.

The tumor pattern emphasizing filter employed in the tumor pattern emphasizing means and the blood vessel pattern emphasizing filter employed in the blood vessel pattern emphasizing means will be described hereinbelow. By way of example, how the image signal SD is processed with the tumor pattern emphasizing filter and the blood vessel pattern emphasizing filter in the embodiment of FIG. 12A will be described below. Processing of the image signal SD2 and processing of the image signal SD3 can be carried out in the same manner during the emphasis of the tumor pattern and the blood vessel pattern.

Abnormal pattern emphasizing means

In the abnormal pattern emphasizing means of the computer system 40, the image signal SD representing the X-ray image is processed with a tumor pattern finding filter, and the tumor pattern appearing in the X-ray image is found.

In order to find the tumor pattern, by way of example, the spatial-domain filter may be employed, which has been described above with reference to FIGS. 7 and 8 and which works with Formulas (23) and (24).

A judgment is made as to whether a predetermined picture element P0 in the X-ray image falls or does not fall within the region corresponding to the tumor pattern in the X-ray image. The tumor pattern emphasized image, in which the tumor pattern appearing in the X-ray image has been emphasized, can be formed by processing the image signal components representing the picture elements of the X-ray image with the filter illustrated in FIG. 7.

Specifically, in the manner described above, for each of the lines Li, the differences Δij between the value of the image signal component f0 representing the predetermined picture element P0 and the values of the image signal components fij representing the picture elements Pij are calculated with Formula (23), and the maximum value of the differences is found. The maximum value thus found is taken as the representative value with respect to the corresponding line.

Thereafter, calculations are made to find the mean-level value, for example, the mean value, of two representative values, which have been found for each set of two lines extending from the predetermined picture element P0 in opposite directions. Specifically, mean values M15, M26, M37, and M48 are calculated respectively for the set of lines L1 and L5, the set of lines L2 and L6, the set of lines L3 and L7, and the set of lines L4 and L8. For the set of lines L1 and L5, the mean value M15 is given by Formula (24).

As described above, two lines extending from the predetermined picture element P0 in opposite directions are grouped into a single set. Therefore, a tumor pattern can be detected accurately even when it is present in a region, in which the image density changes sharply, and the distribution of the values of the image signal components representing the tumor pattern is asymmetric.

From the mean values M15, M26, M37, and M48, which have been calculated in the manner described above, an image signal component corresponding to the predetermined picture element P0 is found in the manner described below. No limitation is imposed on how the image signal component corresponding to the predetermined picture element P0 is found. By way of example, the method described below may be employed for this purpose.

An example of how an image signal component C1 corresponding to the predetermined picture element P0 is found will be described hereinbelow with reference to FIG. 9. In FIG. 9, the horizontal axis represents the mean values M15, M26, M37, and M48, which have been calculated in the manner described above. The vertical axis represents rating values C15, C26, C37, and C48, which correspond respectively to the mean values M15, M26, M37, and M48.

A rating value of zero is assigned to the mean values M15, M26, M37, and M48 in cases where they are smaller than a certain value M1. A rating value of 1.0 is assigned to the mean values M15, M26, M37, and M48 in cases where they are larger than a certain value M2. In cases where the mean values M15, M26, M37, and M48 fall within the range of M1 to M2, a rating value falling within the range of 0.0 to 1.0 is assigned to the mean values M15, M26, M37, and M48, depending upon their values. In this manner, the rating values C15, C26, C37, and C48 are found, which correspond respectively to the mean values M15, M26, M37, and M48. The sum of the rating values C15, C26, C37, and C48, which is expressed as $$C1 = C15 + C26 + C37 + C48 \quad (25)$$

is taken as the image signal component C1 corresponding to the predetermined picture element P0. The image signal component C1 will take a value falling within the range of a minimum value 0.0 to a maximum value 4.0. Every picture element in the X-ray image is taken as the predetermined picture element P0, and the operations described above are carried out for the predetermined picture element P0. In this manner, an image signal representing the tumor pattern emphasized image can be obtained. The tumor pattern can be found by comparing the value of the image signal component C1 with a predetermined threshold value Th2, and sampling only the picture elements which are associated with the condition $C1 \geq Th2$.

In cases where the rating values C15, C26, C37, and C48 are calculated from an equation such as the one represented by the single-dot chained line in FIG. 9, wherein saturation is reached at a small mean value, e.g. M2', the image signal component C1 obtained from Formula (25) will take a larger value in cases where the shape of the tumor pattern is closer to a circle. In cases where the rating values C15, C26, C37, and C48 are calculated from an equation such as the one represented by the double-dot chained line in FIG. 9, wherein saturation is reached at a large mean value, e.g. M2'', the image signal component C1 obtained from Formula (25) will take a larger value in cases where the contrast of the tumor pattern with respect to the surrounding image regions is higher. Therefore, an appropriate equation for transforming the mean values into the rating values can be selected in accordance with the characteristics of the tumor pattern which is to be found.

The algorithms employed in the filter for emphasizing or finding a tumor pattern are not limited to those described above. By way of example, the filter described above with reference to FIG. 10 may be employed.

In such cases, the sum expressed as $$\sum_{i=1}^{8} \{\nabla fij / |\nabla fij| * ei\} m$$

is taken as the value of an image signal component C2. The tumor pattern can be found by comparing the value of the image signal component C2 with a predetermined threshold value Th5, and sampling only the picture elements which are associated with the condition $C2 \geq Th5$.

With the filter described above, the gradients $\nabla fij$ are normalized, and only the projections thereof (i.e. the extent of differences in the value of the signal components in the directions of the lines Li) onto vectors directed from the picture elements Pij to the predetermined picture element P0 are taken into consideration. Therefore, an image signal component C2 is obtained, which will take a large value for a tumor pattern having a circular shape and which does not depend on the contrast of the tumor pattern with respect to the image regions around the tumor pattern. Accordingly, the tumor pattern can be detected accurately.

As a filter utilizing different algorithms, the spatial-domain filter may be employed which has been described above with reference to FIG. 1 and which works with Formula (26), or the like.

In such cases, the ratio C3 calculated with Formula (26) is taken as the value of an image signal component C3 corresponding to the predetermined picture element P0. The the value of the image signal component C3 is compared with a predetermined threshold value Th6. In cases where C3 Th6, because the mean value $\bar{A}$ is comparatively large and the variance $\sigma^2$ is comparatively small, it is judged that the predetermined picture element P0 falls within the region corresponding to the tumor pattern.

As a further example of the spatial-domain filter, the filter may be employed which has been described above with reference to FIGS. 7 and 8 and which works with Formulas (27) through (38). In this case, after the first characteristic value U and the second characteristic value V have been found from Formulas (36) and (37) in the same manner as that described above, an characteristic value C4 is calculated and then used during the judgment as to whether a predetermined picture element P0 falls or does not fall within the region corresponding to the tumor pattern. As the characteristic value C4, the ratio of the first characteristic value U to the second characteristic value V is employed, which is expressed as Formula (38). The characteristic value C4 is taken as the value of an image signal component C4 corresponding to the predetermined picture element P0. The value of the image signal component C4 may be compared with a predetermined threshold value Th7. When C4≧Th7, it can be judged that the predetermined picture element P0 falls within the region corresponding to the tumor pattern.

By processing the image signal representing the X-ray image with one of the spatial-domain filters described above, a combination of these spatial-domain filters, or one of the other known filters, a tumor pattern emphasized image can be formed in which a tumor pattern appearing, typically, as a circular pattern in the X-ray image has been emphasized. Actually, the tumor pattern emphasizing filter is designed not to emphasize a tumor pattern but is designed to emphasize a circular pattern. Therefore, with the tumor pattern emphasizing filter, a pattern of a branch point of a blood vessel and a pattern of a blood vessel, which extends in the direction normal to the plane of the X-ray image, have also been emphasized.

Blood vessel pattern emphasizing means

In the blood vessel pattern emphasizing means of the computer system 40, the image signal SD representing the X-ray image is processed with a blood vessel pattern finding filter described below, and a blood vessel pattern appearing in the X-ray image is thereby emphasized.

As an example of the blood vessel pattern emphasizing filter, the filter may be employed, which has been described above with reference to FIGS. 1, 2, and 3 and which works with Formulas (15), (16), (17), and (18).

By processing the image signal SD representing the X-ray image with this filter, the blood vessel pattern appearing in the X-ray image can be emphasized.

The operations with this filter have the effects described below.

As described above with reference to Formulas (5), (6), and (7), by carrying out the operations expressed as Formulas (3) and (4), the problem can be prevented from occurring in that a boundary line is found as a blood vessel pattern. However, with these operations, the same output value is also obtained for an approximately circular pattern, such as a tumor pattern, the diameter of which is approximately equal to the width of the blood vessel pattern shown in FIG. 3. Therefore, not only a blood vessel pattern extending in an X-ray image is found, but an approximately circular pattern is also detected as a blood vessel pattern. Specifically, as described above with reference to Formulas (8) through (14), with these operations, the blood vessel pattern 1 and the tumor pattern 4 shown in FIG. 3 cannot be discriminated from each other. Therefore, with this blood vessel pattern emphasizing filter, a tumor pattern, the diameter of which is approximately equal to the width of the blood vessel pattern, is also emphasized as a blood vessel pattern.

Therefore, the operations expressed as Formulas (17) and (18) are carried out such that the problems may be prevented from occurring in that a circular pattern is found as a blood vessel pattern.

In such cases, as described above with reference to Formulas (19) through (22), different output values are obtained for the blood vessel pattern 1 in accordance with Formula (20) and for the tumor pattern 4 in accordance with Formula (22). Therefore, only the blood vessel pattern 1 extending in the X-ray image can be found, and no tumor pattern 4 is found by mistake as a blood vessel pattern.

In the blood vessel pattern emphasizing filter described above, the operations are carried out with the mean-level value Q0 of the values of image signal components corresponding to the center region Q0 and the mean-level values Qi, each of which represents the mean level of the values of image signal components corresponding to each of the peripheral regions Qi. The area of the center region Q0 and the areas of the peripheral regions Qi are selected in accordance with the level of noise superposed on the X-ray image, or the like. Therefore, in cases where, for example, the level of noise superposed on the X-ray image is low or noise removal processing is carried out, instead of the mean-level value Q0 and the mean-level values Qi being utilized, operations may be carried out with the value of the image signal component representing the predetermined picture element P0 and the values of the image signal components representing the picture elements Pi.

Also, during the operations with the blood vessel pattern emphasizing filter described above, as shown in FIG. 1, the length of the predetermined distance r is fixed. In an X-ray image, blood vessel patterns having various different widths may appear. In cases where only the blood vessel pattern having a specific width is to be found, the length of the predetermined distance r may be fixed. Alternatively, the length of the predetermined distance r may be varied among a plurality of predetermined distances r. The operations for finding a blood vessel pattern with respect to a predetermined distance r may then be carried out for each of the plurality of the predetermined distances r, and a plurality of image signal components may thus be obtained. The maximum value of the values of the image signal components, which have thus been obtained for the plurality of the predetermined distances r, may be taken as the value of a new image signal component. In such cases, blood vessel patterns having various different widths can be emphasized.

As the blood vessel pattern emphasizing filter, any of other blood vessel pattern emphasizing filters may be employed, with which no circular pattern is emphasized as a blood vessel pattern.

The tumor pattern emphasized image and the blood vessel pattern emphasized image can be formed in the manner described above. Thereafter, a calculating is made to find the difference between the image signal components of the image signal representing the tumor pattern emphasized image and the image signal representing the blood vessel pattern emphasized image, which image signal components represent corresponding picture elements in the tumor pattern emphasized image and the blood vessel pattern emphasized image. By calculating such differences, the emphasis of the blood vessel pattern can be canceled. In this manner, only the true tumor pattern can be emphasized. By carrying out, for example, the process with the threshold value as described above, only the true tumor pattern can be detected accurately.

After a tumor pattern is detected in the manner described above, a visible image is reproduced and displayed on the CRT display device 44 shown in FIG. 5, or the like, such that the the image region, which has been detected as corresponding to a tumor pattern, can be viewed clearly. Such a visible image can serve as an effective tool in the efficient and accurate diagnosis of an illness.

In the aforesaid embodiments of the second, third, and fourth abnormal pattern detecting apparatuses in accordance with the present invention, the tumor pattern is detected, which may appear typically as a circular pattern in the X-ray image of the chest of a human body stored on a stimulable phosphor sheet. However, the second, third, and fourth abnormal pattern detecting apparatuses in accordance with the present invention are not limited to the processing of X-ray images of chests. Also, recording media other than stimulable phosphor sheets may be used. The second, third, and fourth abnormal pattern detecting apparatuses in accordance with the present invention are applicable widely when, from image signals representing radiation images of objects, abnormal patterns in the radiation images are detected.

I claim:

1. An abnormal pattern detecting apparatus for detecting an abnormal pattern having an approximately circular pattern from a radiation image of an object, said radiation image being constituted by an image signal comprising a series of image signal components, the abnormal pattern detecting apparatus comprising:
  i) a first finding means including a first filter for finding a prospective abnormal pattern of an approximately circular pattern, which may appear in said radiation image, by processing said image signal representing said radiation image,
  ii) a second finding means including a second filter for finding a linear pattern, which may appear in said radiation image, by processing said image signal representing said radiation image, said second filter comprising means for finding a linear pattern or a linear pattern, the width and the length of which are approximately equal to each other, said linear pattern appearing in said radiation image, and
  iii) a judgement means for determining whether said prospective abnormal pattern is a true abnormal pattern, said judgement means comprising:
    a) means for selecting an enlarged prospective abnormal pattern region in an area in said radiation image, said area including both said prospective abnormal pattern and said linear pattern found by said first and second finding means, respectively, said enlarged prospective abnormal pattern region including said prospective abnormal pattern and extending to parts in the vicinity of said prospective abnormal pattern,
    b) means for calculating the area of said linear pattern falling within said enlarged prospective abnormal pattern region and the maximum width of said linear pattern falling within said enlarged prospective abnormal pattern region, and
    c) means for judging, from the area and the maximum width of said linear pattern falling within said enlarged prospective abnormal pattern region, whether said prospective abnormal pattern is or is not a true abnormal pattern.

2. An abnormal pattern detecting apparatus as defined in claim 1 wherein said means for calculating the maximum width of said linear pattern falling within said enlarged prospective abnormal pattern region comprises:

means for sequentially taking a plurality of picture elements, which are located in said linear pattern falling within said enlarged prospective abnormal pattern region, as a predetermined picture element, means for calculating the width of said linear pattern falling within said enlarged prospective abnormal pattern region, which width is taken at the position at which each said predetermined picture element is located, and means for finding the maximum width from the widths, which have thus been calculated at the positions at which said predetermined picture elements are located, the width of said linear pattern falling within said enlarged prospective abnormal pattern region, which width is taken at a position at which each said predetermined picture element is located, is calculated by width calculating means comprising:

(1) means for finding the intersection of each of a plurality of lines, which extend from said predetermined picture element toward edges of said radiation image such that two lines extending from said predetermined picture element in opposite directions may be grouped into a single set and a plurality of sets of lines may thus be obtained, and either one of boundary lines defining said linear pattern, (2) means for calculating the distance between each of the intersections, which have thus been found, and said predetermined picture element, (3) means for adding two distances, which have been calculated for each set of two said lines, the distance between the two intersections for each set of two said lines being thereby calculated, (4) means for finding the minimum distance from a plurality of said distances, each of which has been calculated between the two intersection for each set of two said lines, and (5) means for determining the minimum distance as the width of said linear pattern, which width is taken at the position at which said predetermined picture element is located.

3. An abnormal pattern detecting apparatus as defined in claim 1 further comprising means for storing said radiation image on a stimulable phosphor sheet.

4. An abnormal pattern detecting apparatus as defined in claim 3, further comprising means for obtaining said image signal representing said radiation image by exposing said stimulable phosphor sheet to stimulating rays, which cause said stimulable phosphor to emit light in proportion to the amount of energy stored thereon during its exposure to radiation, means for exposing said stimulable phosphor sheet to stimulating rays, and means for photoelectrically detecting the light emitted by said stimulable phosphor sheet.

5. An abnormal pattern detecting apparatus as defined in claim 4 wherein said stimulating rays are a laser beam.

6. An abnormal pattern detecting apparatus as defined in claim 1, further comprising means for recording said radiation image on photographic film.

7. A linear pattern width calculating apparatus, wherein the width of a linear pattern is calculated from an image signal representing a radiation image, in which the linear pattern is embedded, the width of the linear pattern being taken at the position at which a predetermined picture element falling within the region corresponding to the linear pattern is located, the linear pattern width calculating apparatus comprising:
  i) a first distance calculating means comprising:
    means for finding an intersection of each of a plurality of lines, which extend from said predetermined picture element toward edges of said radiation image such that two lines extending from said predetermined picture element in opposite directions may be grouped into a single set and a plurality of sets of lines may be thus obtained, and either one of boundary lines defining said linear pattern, and means for calculating the distance between each of the intersections, which have thus been found, and said predetermined picture element, ii) a second distance calculating means for adding two distances, which have been calculated for each set of two said lines, and calculating the distance between the two intersections for each set of two said lines, and iii) a finding means comprising:

means for finding the minimum distance from a plurality of said distances, each of which has been calculated between the two intersections for each set of two said lines, and means for determining said minimum distance as the width of said linear pattern, which width is taken at the position at which said predetermined picture element is located.

8. A linear pattern width calculating apparatus as defined in claim 7, further comprising means for storing said radiation image on a stimulable phosphor sheet.

9. A linear pattern width calculating apparatus as defined in claim 8, further comprising means for obtaining said image signal representing said radiation image by exposing said stimulable phosphor sheet to stimulating rays, which cause said stimulable phosphor sheet to emit light in proportion to the amount of energy stored thereon during its exposure to radiation, means for exposing said stimulable phosphor sheet to stimulating rays, and means for photoelectrically detecting the light emitted by said stimulable phosphor sheet.

10. A linear pattern width calculating apparatus as defined in claim 9 wherein said stimulating rays are a laser beam.

11. A linear pattern width calculating apparatus as defined in claim 7, further comprising means for recording said radiation image on photographic film.

* * * * *